United States Patent
Colvin et al.

(10) Patent No.: US 9,065,826 B2
(45) Date of Patent: Jun. 23, 2015

(54) IDENTIFYING APPLICATION REPUTATION BASED ON RESOURCE ACCESSES

(75) Inventors: Ryan Charles Colvin, Bothell, WA (US); Elliott Jeb Haber, Fall City, WA (US); Ameya Bhatawdekar, Issaquah, WA (US); Anthony P. Penta, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 601 days.

(21) Appl. No.: 13/205,136

(22) Filed: Aug. 8, 2011

(65) Prior Publication Data
US 2013/0042294 A1 Feb. 14, 2013

(51) Int. Cl.
*G06F 21/00* (2013.01)
*H04L 29/06* (2006.01)
*G06F 21/53* (2013.01)
*G06F 21/62* (2013.01)
*H04L 12/24* (2006.01)

(52) U.S. Cl.
CPC ............... *H04L 63/10* (2013.01); *H04L 12/244* (2013.01); *G06F 21/53* (2013.01); *G06F 21/6218* (2013.01); *H04L 63/145* (2013.01); *G06F 2221/2141* (2013.01)

(58) Field of Classification Search
CPC ..... H04L 63/10; H04L 63/145; H04L 12/244; G06F 21/53; G06F 21/6218; G06F 2221/2141
USPC .................. 726/1, 3, 11–12, 24; 709/206–207
See application file for complete search history.

(56) References Cited

U.S. PATENT DOCUMENTS

| | | | |
|---|---|---|---|
| 6,484,203 | B1 | 11/2002 | Porras et al. |
| 6,704,772 | B1 | 3/2004 | Ahmed |
| 6,721,748 | B1 | 4/2004 | Knight et al. |

(Continued)

OTHER PUBLICATIONS

Tsai, Dwen-Ren, et al; "Optimum tuning of defense settings for common attacks on the web applications";Security Technology, 2009. 43rd Annual 2009 International Carnahan Conference on DOI: 10.1109/CCST.2009.5335560; Publication Year: 2009 , pp. 89-94.*

(Continued)

*Primary Examiner* — Harunur Rashid
*Assistant Examiner* — Angela Holmes
(74) *Attorney, Agent, or Firm* — Bryan Webster; Kate Drakos; Micky Minhas

(57) ABSTRACT

Malware detection is often based on monitoring a local application binary and/or process, such as detecting patterns of malicious code, unusual local resource utilization, or suspicious application behavior. However, the volume of available software, variety of malware, and sophistication of evasion techniques may reduce the effectiveness of detection based on monitoring local resources. Presented herein are techniques for identifying malware based on the reputations of remote resources (e.g., web content, files, databases, IP addresses, services, and users) accessed by an application. Remote resource accesses may be reported to a reputation service, which may identify reputations of remote resources, and application reputations of applications that utilize such remote resources. These application reputations may be used to adjust the application policies of the applications executed by devices and servers. These techniques thereby achieve rapid detection and mitigation of newly identified malware through application telemetry in a predominantly automated manner.

20 Claims, 8 Drawing Sheets

(56) References Cited

U.S. PATENT DOCUMENTS

| | | | |
|---|---|---|---|
| 6,964,017 B1 | 11/2005 | Meisner et al. |
| 6,973,577 B1 | 12/2005 | Kouznetsov |
| 7,177,909 B2 | 2/2007 | Stark et al. |
| 7,237,009 B1 | 6/2007 | Fung et al. |
| 7,328,244 B1 | 2/2008 | Kelley |
| 7,386,892 B2 | 6/2008 | Gilfix et al. |
| 7,409,708 B2 | 8/2008 | Goodman et al. |
| 7,421,498 B2 | 9/2008 | Packer |
| 7,457,844 B2 | 11/2008 | Miller et al. |
| 7,493,403 B2 | 2/2009 | Shull et al. |
| 7,511,723 B2 | 3/2009 | Sylthe et al. |
| 7,523,095 B2 | 4/2009 | Gates et al. |
| 7,548,956 B1 | 6/2009 | Aoki et al. |
| 7,580,984 B2 | 8/2009 | Malik |
| 7,599,992 B2 | 10/2009 | Nakajima |
| 7,640,322 B2 | 12/2009 | Wendkos |
| 7,707,255 B2 | 4/2010 | Satterfield et al. |
| 7,711,743 B2 | 5/2010 | Cavagnaro et al. |
| 7,716,297 B1 | 5/2010 | Wittel |
| 7,725,544 B2 | 5/2010 | Alspector et al. |
| 7,734,670 B2 | 6/2010 | Poozhiyil et al. |
| 7,779,079 B2 | 8/2010 | Nichols |
| 7,779,472 B1 | 8/2010 | Lou |
| 7,797,733 B1 | 9/2010 | Sallam et al. |
| 7,831,707 B2 | 11/2010 | Bardsley |
| 7,844,678 B2 | 11/2010 | Malik |
| 7,849,103 B2 | 12/2010 | Hyatt et al. |
| 7,877,806 B2 | 1/2011 | Repasi et al. |
| 7,882,189 B2 | 2/2011 | Wilson et al. |
| 7,882,542 B2 * | 2/2011 | Neystadt et al. ............... 726/3 |
| 7,921,174 B1 | 4/2011 | Denise |
| 7,930,353 B2 | 4/2011 | Chickering et al. |
| 7,934,254 B2 | 4/2011 | Graham |
| 8,024,266 B1 | 9/2011 | Barber |
| 8,042,149 B2 | 10/2011 | Judge |
| 8,069,481 B2 | 11/2011 | Judge |
| 8,095,612 B2 | 1/2012 | Cowan et al. |
| 8,141,133 B2 | 3/2012 | Pagan |
| 8,171,388 B2 | 5/2012 | Zaltzman |
| 8,180,834 B2 | 5/2012 | Kay et al. |
| 8,306,256 B1 | 11/2012 | Muniello et al. |
| 8,321,516 B2 | 11/2012 | Sargent |
| 2002/0143784 A1 | 10/2002 | Sluiman |
| 2004/0071090 A1 | 4/2004 | Corson |
| 2004/0122926 A1 | 6/2004 | Moore et al. |
| 2005/0004989 A1 | 1/2005 | Satterfield et al. |
| 2005/0030643 A1 | 2/2005 | Gal et al. |
| 2005/0050150 A1 | 3/2005 | Dinkin |
| 2005/0060643 A1 | 3/2005 | Glass et al. |
| 2005/0086166 A1 | 4/2005 | Monk |
| 2006/0174201 A1 | 8/2006 | Zaner-godsey et al. |
| 2007/0016609 A1 | 1/2007 | Kim |
| 2007/0073630 A1 | 3/2007 | Greene |
| 2007/0156732 A1 | 7/2007 | Surendran et al. |
| 2007/0156886 A1 | 7/2007 | Srivastava |
| 2007/0192855 A1 | 8/2007 | Hulten et al. |
| 2008/0028465 A1 | 1/2008 | Bantz et al. |
| 2008/0082662 A1 | 4/2008 | Dandliker et al. |
| 2008/0189162 A1 | 8/2008 | Ganong et al. |
| 2008/0256211 A1 | 10/2008 | Shimizu |
| 2008/0271143 A1 | 10/2008 | Stephens et al. |
| 2008/0307038 A1 | 12/2008 | Nichols |
| 2009/0006366 A1 | 1/2009 | Johnson et al. |
| 2009/0013041 A1 | 1/2009 | Farmer |
| 2009/0044264 A1 | 2/2009 | Ramanathan et al. |
| 2009/0077383 A1 | 3/2009 | De Monseignat et al. |
| 2009/0157830 A1 | 6/2009 | Kim |
| 2009/0282265 A1 | 11/2009 | Aissi et al. |
| 2009/0327006 A1 | 12/2009 | Hansan |
| 2009/0328008 A1 | 12/2009 | Mital et al. |
| 2009/0328209 A1 | 12/2009 | Nachenberg |
| 2010/0004965 A1 | 1/2010 | Eisen |
| 2010/0024739 A1 | 2/2010 | Bakker |
| 2010/0057895 A1 | 3/2010 | Huang |
| 2010/0058058 A1 | 3/2010 | Busari |
| 2010/0094767 A1 | 4/2010 | Miltonberger |
| 2010/0115040 A1 | 5/2010 | Sargent |
| 2010/0125897 A1 * | 5/2010 | Jain et al. ............... 726/7 |
| 2010/0142401 A1 | 6/2010 | Morris |
| 2010/0153325 A1 | 6/2010 | Amoroso et al. |
| 2010/0205254 A1 | 8/2010 | Ham |
| 2010/0205259 A1 | 8/2010 | Vitaldevara et al. |
| 2010/0205665 A1 | 8/2010 | Komili et al. |
| 2010/0211997 A1 | 8/2010 | Mcgeehan et al. |
| 2010/0235367 A1 | 9/2010 | Chitiveli et al. |
| 2010/0235447 A1 | 9/2010 | Goodman |
| 2010/0235625 A1 | 9/2010 | Pandey |
| 2010/0241739 A1 | 9/2010 | Reus et al. |
| 2010/0277997 A1 | 11/2010 | Kim |
| 2010/0318611 A1 | 12/2010 | Curtin et al. |
| 2010/0332428 A1 | 12/2010 | Mchenry et al. |
| 2011/0010304 A1 | 1/2011 | Wong |
| 2011/0047618 A1 * | 2/2011 | Evans et al. ............... 726/23 |
| 2011/0131085 A1 | 6/2011 | Way |
| 2011/0131131 A1 | 6/2011 | Griffin |
| 2011/0191847 A1 | 8/2011 | Davis et al. |
| 2011/0191849 A1 | 8/2011 | Jayoraman |
| 2011/0258264 A1 | 10/2011 | Bremner et al. |
| 2011/0296003 A1 | 12/2011 | McCann |
| 2012/0028606 A1 | 2/2012 | Bobotek |
| 2012/0079099 A1 | 3/2012 | Dhara et al. |
| 2012/0116559 A1 | 5/2012 | Davis et al. |
| 2012/0134548 A1 | 5/2012 | Rhoads et al. |
| 2012/0166179 A1 | 6/2012 | Tirumalachetty et al. |
| 2012/0166533 A1 | 6/2012 | Rubinstein et al. |
| 2012/0198010 A1 | 8/2012 | Bremner et al. |
| 2012/0296965 A1 | 11/2012 | Srivastava |
| 2012/0297484 A1 | 11/2012 | Srivastava |
| 2013/0007152 A1 | 1/2013 | Alspector et al. |
| 2013/0018964 A1 | 1/2013 | Osipkov |
| 2013/0018965 A1 | 1/2013 | Ramachandran |
| 2013/0018972 A1 | 1/2013 | Sargent |
| 2013/0036466 A1 | 2/2013 | Penta |

OTHER PUBLICATIONS de Carvalho Costa, R.L., et al.;"Runtime Estimations, Reputation and Elections for Top Performing Distributed Query Scheduling"; Cluster Computing and the Grid, 2009. CCGRID '09. 9th IEEE/ACM International Symposium on DOI: 10.1109/CCGRID.2009.34 Publication Year: 2009 , pp. 28-35.*

"Upstream Intelligence:A New Layer of Cybersecurity", "Anatomy of Upstream Intelligence". Information Assurance Newsletter vol. 13, No. 3. TysonMacCaulay.com Published Date: Aug. 2010 pp. 22-35 www.TysonMaccaulay.com.

Notice of Allowance cited in related U.S. Appl. No. 12/402,735 Dated: Apr. 29, 2013 pp. 18.

Amendment cited in related U.S. Appl. No. 12/402,735 Dated: Nov. 30, 2012 pp. 17.

Non-Final office action cited in related U.S. Appl. No. 12/402,735 Dated: Aug. 30, 2012 pp. 18.

Amendment cited in related U.S. Appl. No. 12/402,735 Dated: Apr. 9, 2012 pp. 21.

Final office action cited in related U.S. Appl. No. 12/402,735 Dated: Jan. 9, 2012 pp. 26.

Amendment cited in related U.S. Appl. No. 12/402,735 Dated: Sep. 23, 2011 pp. 17.

Amendment cited in related U.S. Appl. No. 13/110,202 Dated: Jun. 17, 2013 pp. 16.

Non Final office action in related U.S. Appl. No. 13/110,202 Dated: Mar. 15, 2013 pp. 36.

Non Final office action in related U.S. Appl. No. 13/180,838 Dated: Jun. 18, 2013 pp. 41.

Non Final office action cited in related U.S. Appl. No. 13/180,877 Dated: Apr. 1, 2013 pp. 34.

Final office action cited in related U.S. Appl. No. 13/110,174 Dated: May 10, 2013 pp. 15.

Amendment cited in related U.S. Appl. No. 13/110,174 Dated: Jan. 9, 2013 pp. 15.

Final office action cited in related U.S. Appl. No. 13/195,245 Dated: May 10, 2013 pp. 90.

(56) References Cited

OTHER PUBLICATIONS

Amendment cited in related U.S. Appl. No. 13/195,245 Dated: Mar. 28, 2013 pp. 16.
Non Final office action cited in related U.S. Appl. No. 13/195,245 Dated: Dec. 28, 2012 pp. 50.
"Uniform Resource Locator" Published Date: Jul. 14, 2011 pp. 4. http://en.wikipedia.org/wiki/index_php?title=uniform_resource_locator&oldid=439380744.
Reply Non-Final Office Action cited in U.S. Appl. No. 12/402,735 dated Jan. 18, 2011, 13 pgs.
Reply Final Office Action cited in U.S. Appl. No. 12/402,735 dated Jun. 6, 2011, 16 pgs.
Notice of Allowance cited in U.S. Appl. No. 12/402,735 dated Sep. 6, 2013, 14 pgs.
Reply Non-Final Office Action cited in U.S. Appl. No. 13/180,877 dated Jul. 1, 2013, 17 pgs.
Non-Final Office Action cited in U.S. Appl. No. 13/110,174 dated Oct. 9, 2012, 13 pgs.
Reply Final Office Action cited in U.S. Appl. No. 13/110,174 dated Aug. 12, 2013, 12 pgs.
Reply Final Office Action cited in U.S. Appl. No. 13/195,245 dated Aug. 12, 2013, 16 pgs.
Wikipedia (Jul. 14, 2011). Uniform Resource Locator, reprinted from the Internet at: http://en.wikipedia.org, 4 pgs.
Macaulay, IAnewsletter, 2010, 47 pgs.
Fong, Philip W.L., "Preventing Sybil Attacks by Privilege Attenuation: A Design Principle for Social Network Systems", Retrieved at <<http://pages.cpsc.ucalgary.ca/~pwlfong/Pub/sp2011.pdf>>, Dec. 1, 2010, pp. 16.
Xu, et al., "Resisting Sybil Attack by Social Network and Network Clustering", Retrieved at <<http://ieeexplore.ieee.org/stamp/stamp.jsp?tp=&arnumber=5598178>>, Proceedings of the 10th Annual International Symposium on Applications and the Internet, Jul. 19-23, 2010, p. 15-21.
Wondracek, et al., "A Practical Attack to De-Anonymize Social Network Users", Retrieved at <<http://www.iseclab.org/papers/sonda-tr.pdf>>, Feb. 1, 2011, pp. 15.
Mislove, et al., "Ostra: Leveraging trust to thwart unwanted communication", Retrieved at <<http://www.mpi-sws.org/~gummadi/papers/ostra.pdf>>, Oct. 15, 2007, pp. 16.
Leung, et al., "Implementation of a Focused Social Networking Crawler", Retrieved at <<http://courses.ece.ubc.ca/412/term_project/reports/2009/focused_social_net_crawler.pdf>>, Retrieved Date: Apr. 14, 2011, pp. 1-6.
Ayodele, et al., "Email Classification and Summarization: A Machine Learning Approach", Retrieved at << http://userweb.port.ac.uk/~khusainr/papers/ccwmsn07_taiwo.pdf >>, IET Conference on Wireless, Mobile and Sensor Networks, Dec. 12-4, 2007, pp. 5.
Martin, et al., "Analyzing Behaviorial Features for Email Classification", Retrieved at << http://citeseerx.ist.psu.edu/viewdoc/download?doi=10.1.1.83.5285&rep=rep1&type=pdf >>,vol. 3 No. 2, Jul. 21, 2005, pp. 8.
Segal, et al., "MailCat: An Intelligent Assistant for Organizing E-Mail", Retrieved at << http://citeseerx.ist.psu.edu/viewdoc/download?doi=10.1.1.65.7439&rep=rep1&type=pdf >>, In Proceedings of the Third International Conference on Autonomous Agents, vol. 22 No. 4, 1999, pp. 8.
"G-Lock Email Processor 1.96", Retrieved at << http://www.freedomloadmanager.org/downloads/parse-incoming-mime-email-835962.html >>, Nov. 10, 2005, pp. 3.
Guan, et al., "Anomaly Based Malicious URL Detection in Instant Messaging", Retrieved at <<http://jwis2009.nsysu.edu.tw/location/paper/Anomaly%20Based%20Malicious%20URL%20Detection%20in%20Instant%20Messaging.pdf>>, The Fourth Joint Workshop on Information Security(JWIS), Aug. 6-7, 2009, pp. 1-14.
Gianvecchio, et al., "Measurement and Classification of Humans and Bots in Internet Chat", Retrieved at <<http://www.cs.wm.edu/~hnw/paper/security08.pdf>>, Proceedings of the 17th conference on Security symposium, 2008, pp. 15.
Bi, et al., "A Trust and Reputation based Anti-SPIM Method", Retrieved at <<http://ieeexplore.ieee.org/stamp/stamp.jsp?tp=&arnumber=4509914>>, IEEE INFOCOM. The 27th Conference on Computer Communications. Apr. 13-18, 2008, pp. 371-375.
Trivedi, et al., "Analyzing Network and Content Characteristics of SPIM using Honeypots", Retrieved at <<http://www.trustedsource.org/download/research_publications/trivedi.pdf>>, Proceedings of the 3rd USENIX workshop on Steps to reducing unwanted traffic on the internet, 2007, pp. 9.
Ramaraj, et al., "Automated Classification of Customer Emails via Association Rule Mining", Retrieved at <<http://www.scialert.net/qredirect.php?doi=itj.2007.567.572&linkid=pdf>>, Information Technology Journal 6(4), 2007, pp. 567-572.
Xia, et al., "An Agent for Semi-automatic Management of Emails", http://www.cs.cityu.edu.hk/~liuwy/publications/EmailAgent_APCHI.pdf, Dept. of Computer Science & Technology, Tsinghua University, Beijing 100084, China Dept. of Computer Science, City University of Hong Kong, Hong Kong SAR, China, pp. 1-8.
Cignini, et al., "E-Mail on the Move: Categorization, Filtering, and Alerting on Mobile Devices with the ifMail Prototype", Retrieved at <<http://www.springerlink.com/content/9ewve0vp3e7xq6ft/fulltext.pdf>>, Mobile and Ubiquitous Info. Access Ws 2003, LNCS 2954, 2004, pp. 107-123.
"Microsoft Outlook 2007 Managing Email with Folders", Retrieved at <<http://lis.dickinson.edu/Technology/Training/Tutorials/ms2007/outlook/outlook_folders.pdf>>, pp. 5.
Yang, et al., "Email Categorization Using Fast Machine Learning Algorithms", Retrieved at <<http://www.springerlink.com/content/cvjuxvrjl1qtwe4v/fulltext.pdf>>, DS 2002, LNCS 2534, 2002, pp. 316-323.
Benevenuto, et al., "Detecting Spammers on Twitter", Retrieved at <<http://ceas.cc/2010/papers/Paper%2021.pdf>>, Seventh Annual Collaboration Electronic Messaging, Anti-Abuse and Spam Conference, Jul. 13-14, 2010, pp. 9.
Xie, et al., "HoneyIM: Fast Detection and Suppression of Instant Messaging Malware in Enterprise-like Networks", Retrieved at <<http://www.foo.be/cours/dess-20072008/papers/154.pdf>>, Dec. 10-14, 2007, pp. 10.
Mayes, Brandon David, "Defending Against Malware in Online Social Networks", Retrieved at <<http://repository.lib.ncsu.edu/ir/bitstream/1840.16/6400/1/etd.pdf>>, 2010, pp. 65.
Aimeur, et al., "Towards a Privacy-enhanced Social Networking Site", Retrieved at <<http://ieeexplore.ieee.org/stamp/stamp.jsp?tp=&arnumber=5438097>>, International Conference on Availability, Reliability and Security, Feb. 15-18, 2010, p. 172-179.
"Improved network security with IP and DNS reputation"—Published Date: Jul. 2010 http://resources.idgenterprise.com/original/AST-0007839_IP_and_DNS_reputation_white_paper_-_4AA2-3535ENW.pdf.
Kwan "Trend Micro™ Smart Protection Network Web Reputation Service Architectural Overview"—Published Date: Nov. 2009 http://trendedge.trendmicro.com/pr/tm/te/document/SPN_and_WRS_Architecture_Overview_091112.pdf.
"Spam and Malware Protection"—Retrieved Date: Apr. 18, 2011 http://blog.bit.ly/post/263859706/spam-and-malware-protection.
"ThreatWatch™ IP Reputation Service from Security On-Demand"—Retrieved Date: Apr. 18, 2011 http://www.securityondemand.com/main/SolutionCenter/ThreatWatch.htm.
"ipTrust Unveils New IP Reputation Intelligence Service"—Retrieved Date: Apr. 18, 2011 http://www.securityweek.com/iptrust-unveils-new-ip-reputation-intelligence-service.
Costa, et al., "Extending Security-by-Contract with Quantitative Trust on Mobile Devices"—Published Date: Feb. 15-18, 2010 http://hal.archives-ouvertes.fr/docs/00/53/67/05/PDF/IMIS10.pdf.
Qian, et al., "Ensemble: Community-based anomaly detection for popular applications"—Published Date: Sep. 14-18, 2009 http://www.cse.umich.edu/~zmao/Papers/ensemble.pdf.
"Bridging the Gap between Data-Flow and Control-Flow Analysis for Anomaly Detection"—Published Date: Dec. 8-12, 2008 http://ieeexplore.ieee.org/stamp/samp.jsp?tp=&arnumber=4721575.
"Intrusion Detection via Static Analysis"—Published Date: May 14-16, 2001 http://ieeexplore.ieee.org/stamp/stamp.jsp?tp=&arnumber=924296.

(56) References Cited

OTHER PUBLICATIONS

"IE8 Security Part III: SmartScreen® Filter"—Retrieved Date: Apr. 15, 2011 http:/blogsmsdncombiearchive/2008/07/02/ie8-security-part-iii-smartscreen-filter.aspx.
Non-Final Office Action Cited in Related U.S. Appl. No. 12/402,735 Dated Oct. 18, 2010.
Final Office Action Cited in Related U.S. Appl. No. 12/402,735 Dated Mar. 30, 2011.
Non-Final Office Action Cited in Related U.S. Appl. No. 12/402,735 Dated Jun. 23, 2011.
Final Office Action cited in U.S. Appl. No. 13/110,202 dated Oct. 19, 2013, 20 pgs.
Final Office Action cited in U.S. Appl. No. 13/180,877 dated Oct. 24, 2013, 24 pgs.
Non-Final Office Action cited in U.S. Appl. No. 13/195,245 dated Sep. 13, 2013, 52 pgs.
Reply Non-Final Office Action cited in U.S. Appl. No. 13/180,838 dated Sep. 18, 2013, 12 pgs.
Final Office Action cited in U.S. Appl. No. 13/180,838 dated Oct. 16, 2013, 29 pgs.
Notice of Allowance cited in U.S. Appl. No. 12/402,735 dated Dec. 16, 2013, 6 pgs.
Reply Final Office Action cited in U.S. Appl. No. 13/110,202 dated Jan. 10, 2014, 13 pgs.
Non-Final Office Action cited in U.S. Appl. No. 13/8110,202 dated Jul. 30, 2014, 35 pgs.
Reply Non-Final Office Action cited in U.S. Appl. No. 13/110,202 dated Oct. 30, 2014, 18 pgs.
Notice of Allowance cited in U.S. Appl. No. 13/110,202 dated Dec. 5, 2014, 13 pgs.
Reply Final Office Action cited in U.S. Appl. No. 13/180,877 dated Jan. 24, 2014, 15 pgs.
Non-Final Office Action cited in U.S. Appl. No. 13/110,174 dated Jun. 6, 2014, 12 pgs.
Reply Non-Final Office Action cited in U.S. Appl. No. 13/110,174 dated Sep. 8, 2014, 12 pgs.
Final Office Action cited in U.S. Appl. No. 13/110,174 dated Jan. 5, 2015, 13 pgs.
Reply Non-Final Office Action cited in U.S. Appl. No. 13/195,245 dated Dec. 13, 2013, 14 pgs.
Final Office Action cited in U.S. Appl. No. 13/195,245 dated Dec. 20, 2013, 49 pgs.
Reply Final Office Action cited in U.S. Appl. No. 13/195,245 dated Mar. 20, 2014, 13 pgs.
Non-Final Office Action cited in U.S. Appl. No. 13/195,245 dated Apr. 4, 2014, 28 pgs.
Reply Non-Final Office Action cited in U.S. Appl. No. 13/195,245 dated Aug. 4, 2014, 11 pgs.
Final Office Action cited in U.S. Appl. No. 13/195,245 dated Aug. 15, 2014, 37 pgs.
Reply Final Office Action cited in U.S. Appl. No. 13/180,838 dated Jan. 16, 2014, 12 pgs.
Non-Final Office Action cited in U.S. Appl. No. 13/180,838 dated Jan. 29, 2014, 30 pgs.
Reply Non-Final Office Action cited in U.S. Appl. No. 13/180,838 dated Apr. 29, 2014, 11 pgs.
Notice of Allowance cited in U.S. Appl. No. 13/180,838 dated Oct. 7, 2014, 23 pgs.
"Priority Inbox", sorts important e-mail for you, Cheng J. Gmail, Aug. 30, 2010, Ars Technics reprinted from the Internet at: http://arstechnica.com/business/2010/08/gamil-aims-to-learn-from-you-sort-important-e-mail-to-top/, 2 pgs.

* cited by examiner

US 9,065,826 B2

IDENTIFYING APPLICATION REPUTATION BASED ON RESOURCE ACCESSES

BACKGROUND

Within the field of computing, many scenarios involve an execution of an application in various contexts (e.g., an application natively executing on a device, or managed by a runtime; an application executing within a virtual environment of the device, such as within a web browser; and an application executing remotely on a server and communicating with the user through a user interface rendered on a device). A particular context that is an area of contemporary focus is locally executing web applications, e.g., applications coded as web content (e.g., JavaScript and HTML 5) that may be executed without the encapsulating user interface of a web browser, thus resembling a native application but executing within the virtual environment of a web browser.

However, such software includes malware, comprising applications that perform activities that are undesirable to the user, such as corrupting the computing environment by deleting files; sending personal information of the user (e.g., authentication credentials and financial information) to another party; enable control of the device by another party, e.g., as part of a botnet; and/or spreading to other devices operated by the user or other users. Many techniques may be utilized to identify and mitigate the acquisition, distribution, and effects of malware. As a first example, application binaries may be scanned for identifiers of malware (e.g., resources or segments of code that often appear within a particular type of malware) prior to executing the application binary. However, many forms of malware avoid detection in this manner by encrypting such resources or segments of code; rendering code in a polymorphic manner that may take many forms but may achieve the same result; or hiding malicious executable code in non-code resources that are not scanned by malware detectors (e.g., hiding code within an image bitmap). As a second example, the device may monitor the utilization of local resources by respective processes; e.g., a process that is utilizing a large amount of memory or bandwidth may be identified for further evaluation by the device or by malware analysts. However, such monitoring may not be highly diagnostic; e.g., many legitimate processes may use large amounts of memory and/or bandwidth, while some processes comprising malware may maintain a low profile by using only modest amounts of memory or bandwidth. As a third example, the device may detect particular behaviors of respective processes that are often exhibited by malware; e.g., the device may detect an attempt to redirect keyboard input in a covert manner, to install other applications without the consent of the user, or to execute code in a non-code resource. However, some forms of malware may achieve malicious results through behaviors that appear to be legitimate.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While contemporary efforts to identify malware often focus on the nature and characteristics of the application binary and/or executing processes, it may be difficult to achieve comprehensive protection in this manner, due to the wide variety of techniques that may avoid such detection. For example, an application may exhibit entirely legitimate behavior until a particular triggering event, and may then exhibit new behavior that achieves a malicious result (e.g., botnet malware that infects a particular device may remain dormant and undetectable until receiving a remote command from a botnet controller). In the particular context of locally executing web applications, a web application may execute in an ordinary manner, but may request and/or receive malicious web content that may alter the behavior of the web application, and/or may spontaneously transmit information to another party without the involvement of the user (e.g., phishing malware may remain dormant until detecting user credentials for a banking website, and may then transmit the credentials to another party). Thus, changes in application behavior may be achieved in many simple ways, and comprehensive detection may involve prohibitively resource-intensive techniques (e.g., continuously scanning the code of an executing process for changes that may resemble malware). Moreover, the increasing volume of available software, the increasing variety in types of malware, and the increasing sophistication of evasion techniques may outpace the rate at which human malware analysts may characterize and mitigate the effects of newly identified malware.

Presented herein are alternative techniques for detecting malware that relate to monitoring the interaction of an application with remote resources. As a first example, a computer executing an application (e.g., a client device, or a server executing the application on behalf of another device and/or user) may monitor the types of remote resources that are requested, received, and/or utilized by the application. As a second example, an application may endeavor to communicate with one or more remote sources, such as particular servers, services, or addresses. In such scenarios, a reputation may be identified for remote resources (e.g., for particular files, databases, devices, servers, services, users, or network addresses) that may be accessed by an application, and an application reputation of an application may be identified based on the resource reputations of remote resources utilized by the application (particularly where such resources are accessed in the absence of a request from the user).

These techniques may be illustrated in the following exemplary scenario. A device may be configured to monitor the remote resources that are accessed by an application (e.g., URLs of web-accessible objects, and network requests involving particular addresses, ports, protocols, or services), particularly if such accesses are initiated spontaneously by the application without prompting by a user. For respective applications, the device may report the remote resources accessed by the application to a reputation service. Based on the collected information, the reputation service may identify a resource reputation for respective remote resources (e.g., a remote resource that is often accessed by applications that subsequently exhibit malicious behavior); and, for respective applications, the reputation service may identify an application reputation based on the resource reputations of the remote resources utilized by the application. This information may be utilized to identify maliciously executing applications. For example, the reputation service may distribute the application resources (and optionally the resource reputations) to one or more devices, which may refer to this information while determining whether and how to execute a particular application (e.g., choosing an application policy for the application, such as an unrestricted application policy for reputable applications and a limited application policy for questionable applications, while blocking execution of applications having poor reputations). Alternatively or additionally, the devices may monitor the remote resources accessed by respective applications, and may adjust the application policy of the application based on the resource reputations of the remote resources accessed by the application. A server (including a server associated with the reputation service) may also utilize this information to mitigate the effects of malware; e.g., an application server that is configured to provide and/or execute applications on behalf of devices may restrict or remove applications that are identified as having poor application reputations, and/or that access remote resources with poor resource reputations. Such techniques may be automated to achieve a more comprehensive and rapid identification of malware and response thereto than may be achievable through malware mitigation techniques that heavily involve human malware analysts.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
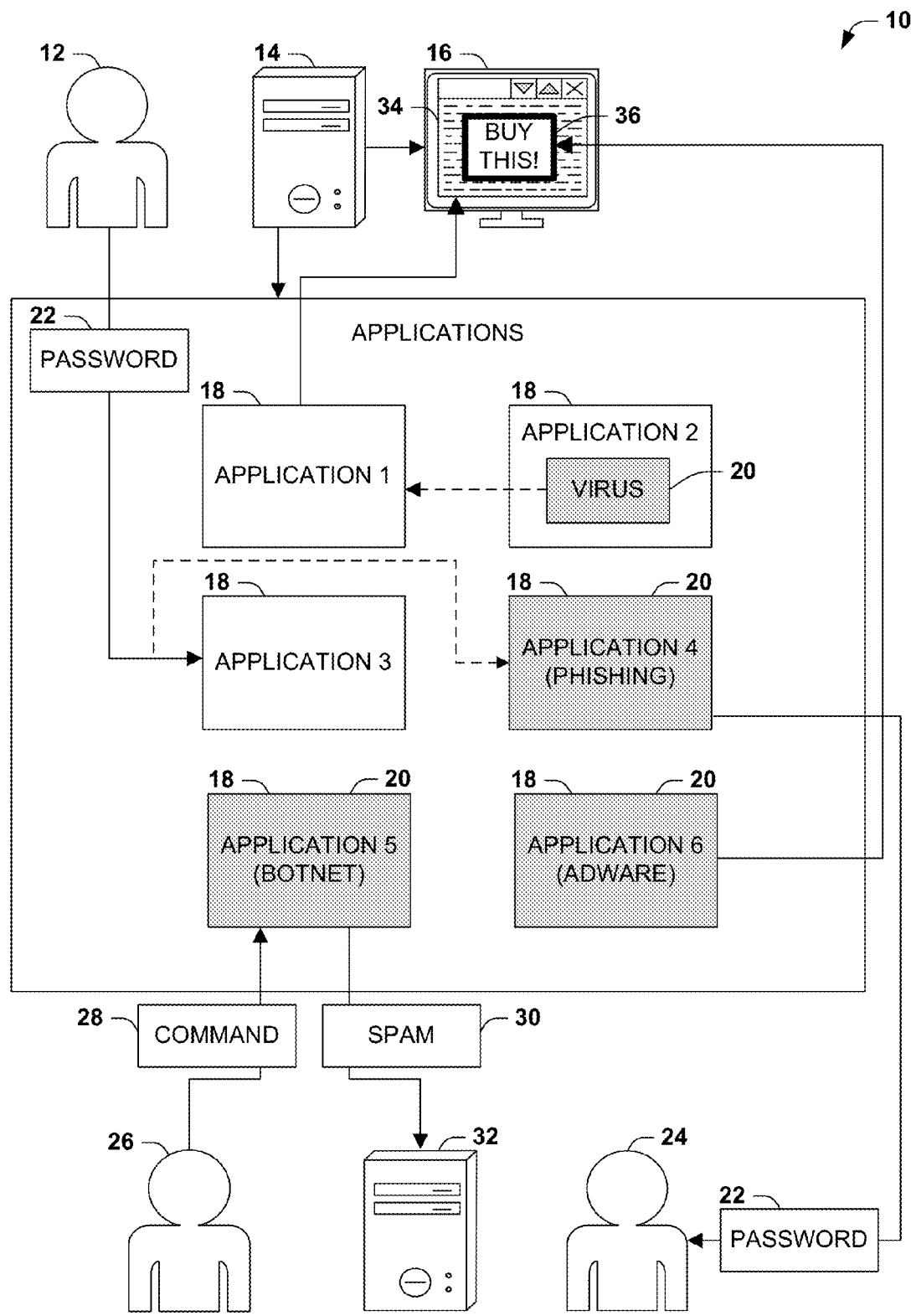
FIG. 1 is an illustration of an exemplary scenario featuring some forms of malware that may afflict a device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve the execution of an application by a processor of a device, such as a server, a workstation, a notebook, a game console, a smartphone, a tablet, or a personal information manager. Applications may also be executed within many contexts, such as a natively executing application comprising wholly or partially instructions executing on the processor; an application serviced by a runtime; and an application executing within a virtual environment, such as a web browser, an emulated machine, or a sandbox. The execution of an application may also involve a second device; e.g., the executable binaries for an application may be provided to the device by a server (such as an application store), or a remote server may execute the application on behalf of a device and present to the device a user interface of the application that may be rendered for a user (e.g., cloud-based applications). One particularly prevalent example involves locally executing web applications, which may be designed using web application technologies (e.g., JavaScript and HTML 5) and that may executed within a web browser, but that may also be executed without the user interface elements typically included in a web browser, such as an address bar and navigation controls. Such applications may fully resemble natively executing applications, but may nevertheless utilize the web application platform, and may therefore leverage several of the advantages of the web programming model (e.g., platform-independence and application isolation).

However, many types of applications may include one or more forms of malware that perform activities that are undesirable to the user. Such malware may take many forms, and may infiltrate a device of a user in many ways. As a first example, an application that is engineered to perform malicious activities may be delivered to the user under false pretenses (e.g., a fake application that purports to perform a useful activity, but that alternatively or additionally performs a malicious activity). As a second example, an application may be covertly delivered to the user (e.g., a remote user or process may exploit a security vulnerability to gain unauthorized access to the file system of a user's device, and may install and/or invoke the application on the device). As a third example, a portion of malicious code may be inserted in a legitimate application that, when executed on a device, attempts to achieve insertion in other legitimate applications or devices. As a fourth example, a user may expressly or implicitly consent to receive an application that performs undesirable activities, such as presenting unsolicited advertisements to the user. Moreover, malware may attempt to evade detection and/or removal; e.g., some forms of malware are deployed to a device as a set of components that each monitors the continued availability of the other components, and that rapidly redeploys a removed component.

Adware may also perform many types of undesirable activities. FIG. 1 presents an exemplary scenario 10 featuring a user 12 of a device 14 having a display 16 that is configured to execute a set of applications 18, some of which may comprise various forms of malware 20 that perform various activities that are undesirable to the user 12. As a first example, the device 14 may include a first application 18 that is legitimate, and a second application 18 that has been transformed into malware 20 by a virus. The virus be may embodied, e.g., as a code segment inserted into the legitimate code of the second application 18; an executable macro inserted into a document; or as a plug-in or add-on that runs within an extensibility feature of the second application 18. When the user 12 executes the second application 18, the virus may attempt to infect the first application 18 in order to broaden the deployment of the virus 20. As a second example, a fourth application 18 may include a "phishing" type of malware 20 that attempts to access sensitive information on the device 14 and transmit this information to another party 24. For example, the malware 20 within the fourth application 18 may trap and monitor keyboard input to other applications 18, and when the user 12 transmits a password 22 to the third application 18, the malware 20 may intercept the password 22 and covertly send it to the other party 24. As a third example, a fifth application 18 may enroll the device 14 in a botnet that may be controlled by commands 28 received from a botnet controller 26. For example, the fifth application 18 may remain dormant, or may perform a desirable service for the user 12, while remaining receptive to commands 28 received from the botnet controller 26, who may instruct the device 14 to perform various undesirable activities, such as sending bulk unsolicited email messages 30 ("spam") to a set of targets 32, or participating in a distributed denial-of-service attack by sending unproductive traffic to a particular target 32. As a fourth example, a sixth application 18 may include malware 20 in the form of adware, which may present unsolicited advertisements 36 on the display 16 atop the user interfaces 34 of other applications 18. These and other behaviors may be exhibited by malware 20 that may be deployed to the device 14 of the user 12.

Many techniques have been devised to detect, characterize, and mitigate the effects of malware 20. Security vendors often utilize teams of malware analysts who receive reports of suspected malware 20, perform tests to identify and evaluate the characteristics and behaviors of the malware 20, and devise techniques to detect, mitigate, and remove the malware 20 from infected devices 14. Such techniques are often packaged as a security application that may be deployed to devices 14 to provide defense against various forms of malware 20, and updates to the security application may provide new detection and protection techniques for newly identified forms of malware 20. Automated techniques may also be utilized that may obstruct many types of malware; e.g., network routers often utilize features such as firewalls that restrict forms of communication that are frequently used by malware, and network address translation (NAT) that inhibits unsolicited contact with a device on the network.

Many techniques for detecting and characterizing malware 20 involve an evaluation of an analysis of the applications 18 installed and/or executing on the device 14 to identify signs of malware 20. As a first example, many malware evaluation techniques involve an evaluation of the resources comprising respective applications 18, such as an inspection of the code comprising executable binaries. For example, a malware analyst may identify a particular pattern of instructions that identify a particular type of malware 20, and any application 18 that presents this pattern of instructions may be identified as potentially including malware 20. The malware analysts may then package representations of the patterns of instructions (e.g., hashes for portions of code comprising malware 20) to one or more devices 14, which may examine the code comprising respective applications 18 to detect malware 20. This examination may be applied upon first receiving a deployment of the application 18, upon receiving a request to execute the application 18, and/or during the execution of the application 18. As a second example, many malware evaluation techniques involve an assessment of the utilization of respective applications 18 of the local resources of the device 14. For example, an application 18 that consumes a significant amount of bandwidth may be tentatively identified as malware 20 involved in a botnet (e.g., sending bulk unsolicited email messages or sending unproductive traffic to a target of a denial-of-service attack). As a third example, many malware evaluation techniques involve a monitoring of the local behaviors of respective applications 18 to detect behaviors that are characteristic of various forms of malware 20. For example, phishing malware 20 often endeavors to intercept input provided by the user 12 to other applications; virus malware 20 often involves an attempt by a first application 18 to alter the code of a second application 18; and many types of malware 20 involve a covert utilization of computing resources (e.g., a data transmission that is hidden from the user 12), a covert deployment of resources (e.g., installing other applications 18 without notification or consent from the user 12), and/or techniques to resist removal as requested by the user 12. Security software may therefore be configured to detect such suspicious code patterns, resource utilization, and/or behaviors by applications 18, to identify such applications 18 as potential malware 20, and to report these findings 18 to the user 12 or the security vendor and/or mitigate the effects thereof, such as by restricting or removing such malware 20.

Figure 2:
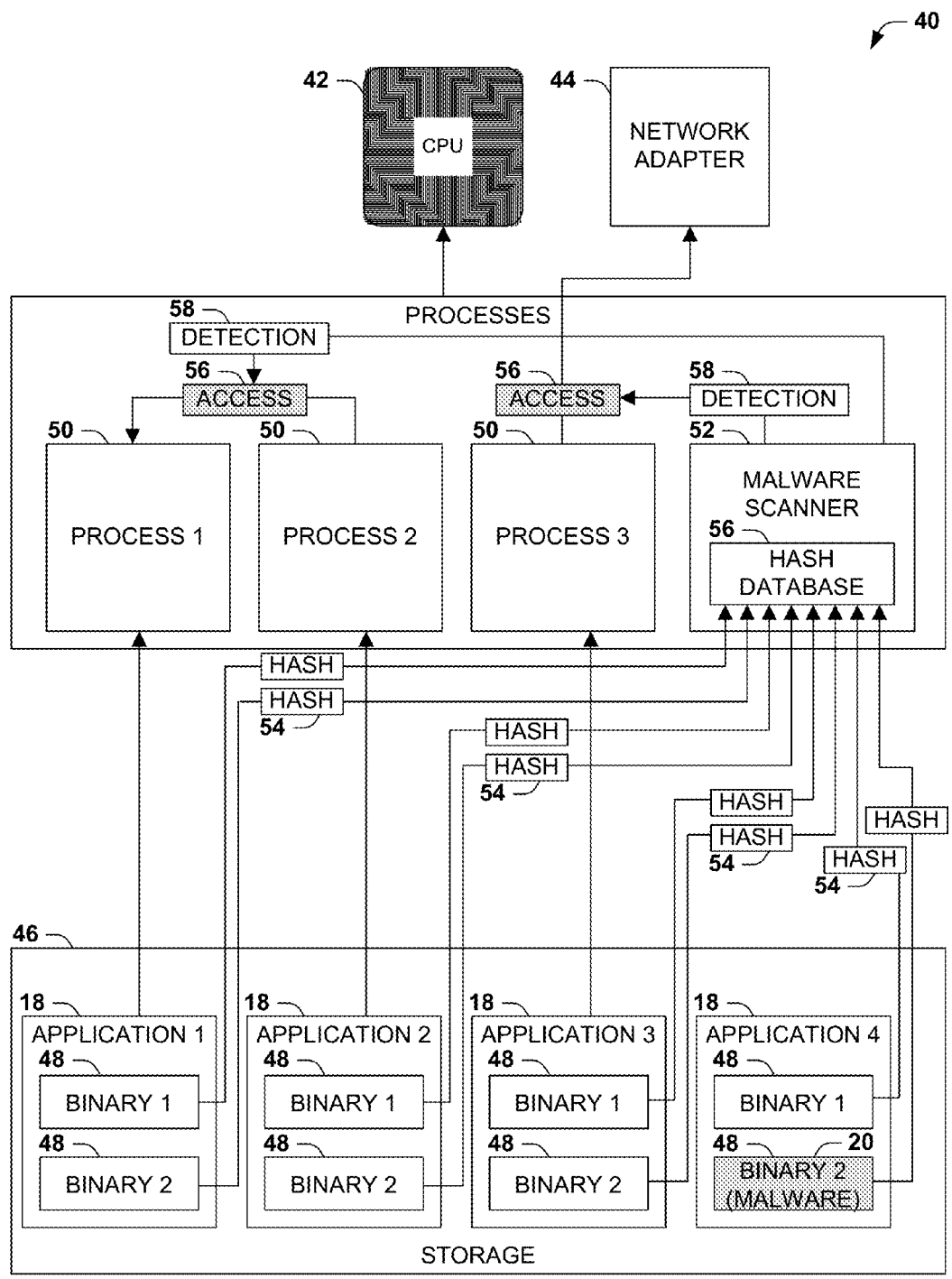
FIG. 2 is an illustration of an exemplary scenario featuring a detection of various forms of malware by a malware scanner.

FIG. 2 presents an illustration of an exemplary scenario 40 featuring some types of techniques for detecting malware 20 based on an evaluation of the local components and activities of respective application 18. This exemplary scenario 40 involves a device 14 comprising a processor 42, a network adapter 44, and a storage component 46, upon which a set of four applications 18 is stored for execution. The device 14 in this exemplary scenario 40 also includes a malware scanner 52 that employs several techniques to detect malware 20 among the applications 18. As a first technique, the malware scanner 52 may be configured to scan the executable binaries 48 of respective applications 18 in order to detect patterns of instructions that are characteristic of malware 20. The malware scanner 52 may calculate a hash 54 for each executable binary 48 (or portion thereof) and compare such hashes 54 against a hash database 56, thereby detecting that a particular executable binary 48 of the fourth application 20 comprises malware 48, and may therefore instruct the device 14 not to permit execution of the fourth application 18. As a second technique, while applications 18 are executed as processes 50 by the processor 42, the malware scanner 52 may review the resource utilization of respective processes 50. For example, if the malwares scanner 52 detects 58 that the third process 50 is requesting or performing an access 56 of a network adapter 44 in a suspicious manner (e.g., consuming large amounts of bandwidth; accessing the network adapter 44 in an obfuscated manner; or accessing the network adapter 44 without explanation, such as on behalf of an application 18 that does not involve network access, like a calculator application), the malware scanner 52 may flag the third process 50 and the third application 18 as potentially comprising malware 20. As a third technique, the malware scanner 52 may monitor the behaviors of the processes 50 to detect 58 behaviors that are indicative of malware 20. For example, if the second process 50 attempts an access 56 of the first process 50 (e.g., intercepting communication between the first process 50 and a user 12, or accessing a memory location reserved for the first process 50), the malware scanner 52 may identify the second process 50 and the second application 18 as potentially comprising malware 20. In this manner, the malware scanner 52 in the exemplary scenario 40 of FIG. 2 may utilize various techniques to monitor and evaluate the local components and local activities of applications 18 and processes 50 in order to detect various forms of malware 20.

B. Limitations of Malware Detection Techniques Based on Evaluation of Local Components and Activities While many techniques have been devised to identify and mitigate malware 20 based on the assessment of local components and local activities, such techniques may present various limitations that impair the detection and mitigation of malware 20. As a first example, code scanning techniques may be computationally intensive, due to the potential volume of data to be scanned and the number of code patterns that may be detectable. Moreover, malware designers have devised many techniques for avoiding the detection of code patterns, such as polymorphic code that may be altered for each deployment of malware 20 without altering the functionality achieved by the code; self-altering code that may initially appear to be legitimate, but that may be altered during execution to achieve instructions comprising malware 20 (e.g., storing malware code in an encrypted manner and decrypting it during execution); the insertion of malicious code for execution by other processes 50, such as by exploiting a buffer overflow; and steganography, whereby malware code may be hidden within resources that ordinarily do not contain executable code, such as an image bitmap. Such techniques may also be detectable through highly sophisticated heuristics, but may result in a resource-intensive scanning process that imposes an unacceptable performance reduction of the computing environment, and/or that results in a significant number of false positives (e.g., legitimate applications 18 identified as malware 20 due to coincidental resemblances).

As a second example, techniques based on the detection of malware 20 based on resource utilization, such as the consumption of memory, storage, processor capacity, or network bandwidth, may not be of significant diagnostic value. For example, while some forms of malware 20 may consume large amounts of resources, such as a botnet that consumes the upload capacity of a device 14 to maximize the delivery of spam or the transmission of unproductive data in a denial-of-service attack, other forms of malware 20 may consume comparatively few resources; e.g., phishing software may achieve the unauthorized disclosure of sensitive information to another party 24 while consuming very few resources. Additionally, the types of malware 20 that involve the consumption of significant computing resources may reduce such consumption in order to avoid detection. For example, a botnet that configures each device 14 to send only modest amounts of unproductive traffic to a target of a distributed-denial-of-service attack, and may achieve an overwhelmingly effective attack from a sizable botnet (e.g., a million devices 14), and in a highly sustainable manner due to the difficulty of identifying the devices 14 comprising the botnet. Conversely, many legitimate applications may consume large amounts of resources (e.g., a video streaming application may exhaust the bandwidth and processor capacity of a device 14 in order to receive, decompress, and display high-definition video), and it may be difficult to distinguish legitimate activity form malicious activity according to the profile of consumed computing resources. Thus, malware detection techniques involving an evaluation of the resource utilization of the computing environment of the device 14 may have difficulty achieving accurate diagnostic results.

As a third example, malware detection based on the evaluation of local behaviors of processes 50 may be difficult to apply due to the large variety of such behaviors that may be utilized by malware 20. For example, a less sophisticated type of phishing malware 20 may utilize a well-known technique to attempt to intercept communication between a user 12 and a process 50, and this behavior may be easily detected and characterized by a malware scanner 52. However, a more sophisticated type of phishing malware 20 may only activate in particular conditions, such as when executed by a user 12 or device 14 of an entity targeted by the malware designer; may utilize an unknown or even unique interception technique; and may do so in a primarily legitimate manner, with an interception side-effect under particular conditions that may appear to be unintended or coincidental. This type of phishing malware 20 may only be identified as such after extensive evaluation by researchers, and in the interim may relay a large amount of sensitive data to another party 24. Moreover, as with code profiling, the detection sensitivity of such techniques may be improved through more stringent monitoring (e.g., automated scrutiny of each instruction of a process 50), but such monitoring may prohibitively reduce the performance of the computing environment.

Thus, it may be appreciated that malware scanning techniques that rely upon an evaluation of the local components and activities of applications 18 to detect and mitigate malware 20 may be difficult to achieve in a performant manner, due to the increasing variety and sophistication of malware 20 designed to execute on a rapidly expanding set of devices 14. Moreover, the complexity of this task is exacerbated by the variety of execution contexts within which such applications may execute. In particular, web applications (executing either within the user interface of a web browser or as locally executing web applications) may request and receive web content from a variety of sources, and such content may include various forms of executable code, such as third-party applications executing within the web application and JavaScript embedded in third-party advertisements rendered within the web application. In addition to the challenges posed with the detection of malware 20 in a static and unchanging application 18, this type of application presents a large range of behavioral fluidity within the computing environment of the device 14, and the local code, local resource utilization, and local behaviors of the application 18 may change at any moment upon receiving new web content. Determining the malware status of such an application 18 through techniques involving an evaluation of locally stored components and local activities may involve constant monitoring, which may unacceptably reduce the performance in the execution of the application 18 by the device 14. Such examples highlight the difficulty of identifying malware 20 through the evaluation of locally stored components and local activities.

C. Presented Techniques

Presented herein are alternative techniques for detecting and mitigating malware 20 among the applications 18 and processes 50 executing within the computing environment of a device 14. It may be observed that, in addition to locally stored components (e.g., instruction sets) and activities (e.g., resource utilization and behaviors), malware 20 often involves an accessing of a remote resource. As a first example, a virus or worm is often deployed to a device 14 from a particular remote resource, such as a request to retrieve the latest version of the virus or worm from a malware source. As a second example, in addition to retrieving sensitive information, phishing malware is configured to send the sensitive information to a particular remote resource, such as a particular user, device, or IP address. As a third example, a botnet often involves the retrieval of particular types of remote resources (e.g., a rootkit), and/or communication with a particular remote resource (e.g., the receipt of commands 28 from a botnet controller 26). As a fourth example, adware often involves the receipt of advertising content from a remote resource, such as an advertisement database. Thus, it may be observed that many types of malware 20 may involve, and may be detected by, resource accesses of particular remote resources.

In view of these observations, the present disclosure involves the detection of malware 20 according to resources accesses of remote resources. Moreover, such detection may be achieved through a cooperative arrangement of the devices 14 executing the application 18. For example, devices 14 may be configured to, for a particular application 18, monitor the resource accesses of remote resources that are accessed by the application 18. Such remote accesses may be reported by the devices 14 to a reputation service, which may evaluate the remote resources to identify a resource reputation. For example, if the reputation service detects that a particular application 18 frequently accesses a particular remote application, or that many devices 14 and/or applications 18 are suddenly accessing a particular remote resource, the reputation service may automatically initiate an evaluation of the remote resource. Using a variety of heuristic techniques, the reputation service may automatically identify a resource reputation for the remote resource, indicating whether or not applications that access the remote resource may be identified as malware. Additionally, based on the identified resource reputations, the reputation service may identify an application reputation for respective applications 18. The application reputation may be used by the reputation service (e.g., to remove malware 20 from an application store associated with the reputation service), and/or may be distributed to one or more devices 14 for use in detecting and mitigating malware 20 (e.g., by determining whether and how to execute a particular application 18 according to the application reputation of the application 18 that has been reported by the reputation service).

Figure 3:
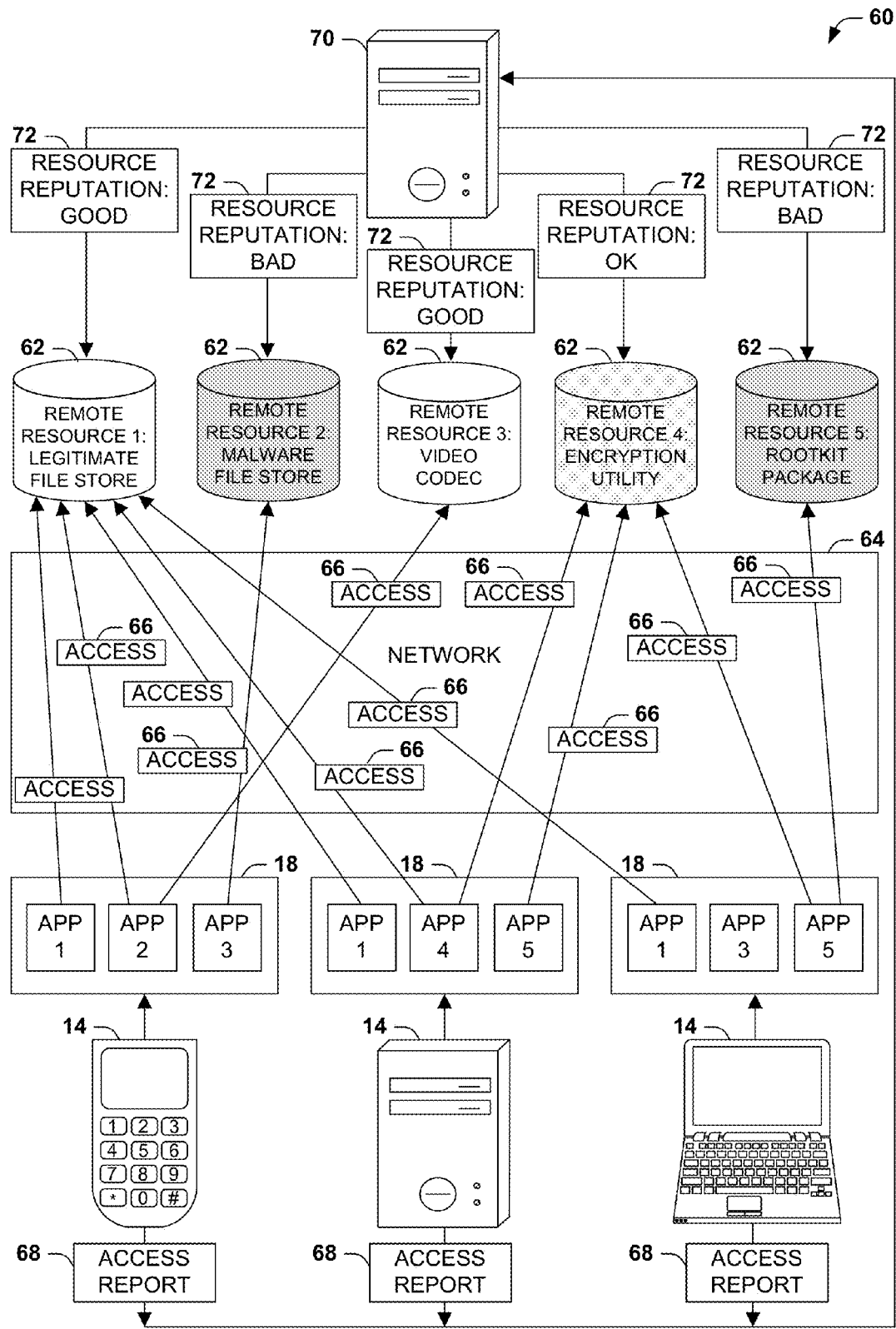
FIG. 3 is an illustration of an exemplary scenario featuring an assignment of resource reputations to remote resources associated with resource accesses requested by applications executing on devices according to the techniques presented herein.
Figure 4:
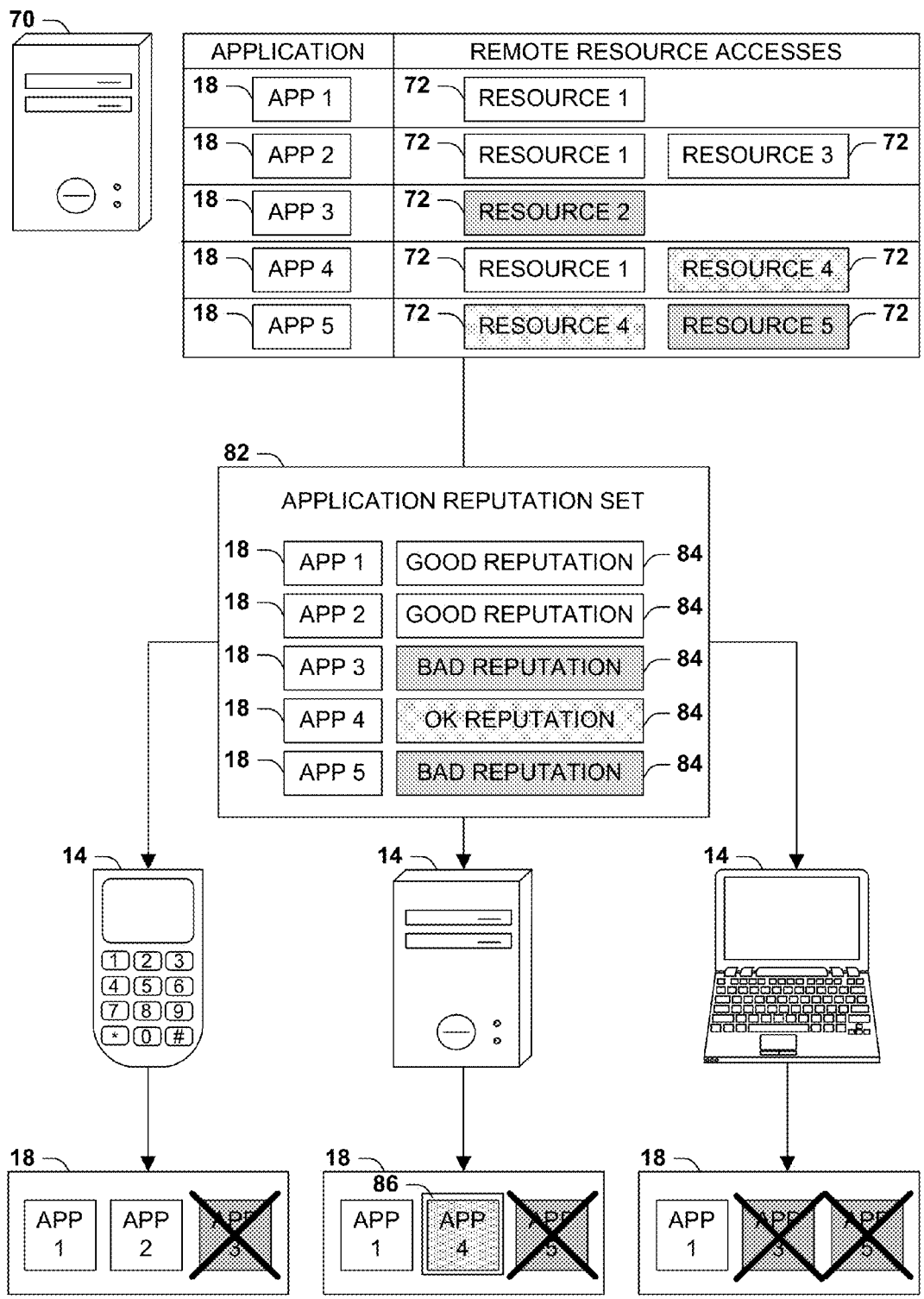
FIG. 4 is an illustration of an exemplary scenario featuring an identification and exemplary use of application reputations of applications, based on the resource reputations of resources involved in resource accesses by the applications, in accordance with the techniques presented herein.

FIGS. 3-4 together present an illustration of an exemplary scenario featuring an exemplary use of the techniques presented herein to identify and utilize application reputations of respective applications 18. In the exemplary scenario 60 of FIG. 3, a set of devices 14 stores and executes a set of applications 16, each of which may access one or more remote resources 62. Such applications 18 may comprise, e.g., locally executing native applications 18 that interact with remote resources 62; web applications executing on the devices 14 and rendered within the user interface of a web browser, or as a locally executing web application 18 that is presented without an encapsulating web browser user interface; or a user interface of an application 18 executing partly or wholly on another device (e.g., a cloud-enabled application). However, such applications 18 may receive and incorporate many types of malware 20 (e.g., an application 18 or portion thereof may have been designed and deployed to the device 14 as malware; may have been infected by a virus; may have been covertly installed on the device 14 without the consent of the user 12; or may have received web content that includes malware 20). In order to detect and mitigate the effects of malware 20, the devices 14 may interact with a reputation service 70. In particular, the devices 14 may identify resource accesses 66 of respective applications 16 with one or more remote resources 62. Such resource accesses 66 may involve many types of remote resources 62 (e.g., a particular file, portion of web content, service, server, device, or user); may be unidirectional (e.g., from the application 18 to the remote resource 62 or vice versa); and may be initiated spontaneously by the remote resource 62, spontaneously by the application 14 in the absence of a request from a user 12, or in response to a request from a user 12. Additionally, the resource accesses 66 for a particular application 18 may differ per device 14; e.g., the fifth application 18 may access only the fourth resource 62 while executing on the second device 14, but may access the fourth resource 62 and also the fifth resource 62 when executing on the third device 14. Such changes in resource accesses 66 may be prompted, e.g., by differences in the devices 14, the networks to which the devices 14 are connected (e.g., a high-bandwidth network vs. a low-bandwidth network), different users 12 of the devices 14, different execution contexts (e.g., a locally executing application vs. an application isolated within a web browser), and/or application policies (e.g., executing under user accounts having different levels of privileges).

As further illustrated in the exemplary scenario 60 of FIG. 3, the devices 14 may be configured to detect such resource accesses 66 for respective applications 18, and to provide resource access reports 68 to the reputation service 70. Such reports of resource accesses 66 may indicate, e.g., the application 18 and various details thereof, such as the application configuration and application state; and/or the remote resource 62 and various details thereof, such as the IP address, the URL of an accessed resource, identifying information returned by a server or user, and information sent by the application 18 while initiating or participating in the resource access 66. The reputation service 70 may receive the resource access reports 68 from the devices 14 and may evaluate the remote resources 62 indicated thereby to identify a resource reputation 72 indicating the probability and extent that the remote resource 62 is involved in malware, and the severity of the threat posed thereby (e.g., a remote resource 62 associated with a phishing scenario may pose a more serious threat than a remote resource 62 associated with an adware vendor). In this exemplary scenario 60, the reputation service 70 may select a good resource reputation 72 for a first remote resource 62 (comprising a file store offering legitimate files) and a third remote resource 62 (comprising an access of a file representing a video codec); an "OK" (i.e., questionable or marginally suspicious) resource reputation 72 for a fourth remote resource 62 (comprising an encryption utility that is utilized for legitimate tasks, but that is also frequently utilized by malware 20); and a bad resource reputation 72 for a second remote resource 62 (comprising a file store providing malware 20) and a fifth remote resource (comprising a rootkit package that is often covertly installed to enroll a device 14 in a botnet).

FIG. 4 presents an exemplary scenario 80 featuring an exemplary use of the resource reputations 72 determined in the exemplary scenario 60 of FIG. 3. In this exemplary scenario 80, the reputation service 70 is configured to, based on the resource access reports 68 provided by the devices 14, generate an application reputation set 82 comprising application reputations 84 for respective applications 18 based on the resource reputations 72 of the remote resources 62 accessed by the application 18. For example, the reputation service 70 may determine that a first application 18 has been reported as accessing only the first remote resource 62 that has a good resource reputation 72, and may therefore identify a good application reputation 84 for the first application 18. However, the reputation service 70 may note the resource access 66 by the fourth application 18 of the fourth remote resource 62 that has been assigned an "OK" resource reputation 72, and may therefore assign an "OK" (i.e., questionable or marginally suspicious) application reputation 84; and for the fifth application 18, which has accessed both the fourth remote resource 62 having an "OK" resource reputation 72 and the fifth remote resource 62 having a poor resource reputation 72, the reputation service 70 may identify a poor application reputation 84.

The reputation service 70 may also use the application reputation set 82 in various ways. As further illustrated in the exemplary scenario 80 of FIG. 4, the reputation service 70 may send the application reputation set 82 to the devices 14, which may use the application reputations 84 to adjust the execution of the applications 18. For example, a device 14 that receives a request to execute the first application 18 may consult the application reputation set 82, may determine that the first application 18 has been assigned a good application reputation 84, and may execute the first application 18 in a trusted and highly performant manner. However, a device 14 that receives a request to execute the fourth application 18 may, in accordance with the "OK" application reputation 84 of the fourth application 18 in the application reputation set 82, initiate an isolated execution of the fourth application 18, e.g., by restricting the process 50 generated by the fourth application 18 from accessing other processes 50, the storage 46 of the device 14, or the network 64. Moreover, applications 18 having a poor application reputation 84 in the application reputation set 82 (e.g., the third application 18 and the fifth application 18) may be blocked from execution on the devices 14, or may be executed only with the informed consent of a user 12 or administrator of the device 14. In particular, the devices 14 may be configured to execute respective applications 18 according to an application policy selected in view of the application reputation 84 of the application 18. The reputation service 70 may also use the application reputations 84 and/or resource reputations 72 in other ways; e.g., the reputation service 70 may also utilize the reputations to adjust the execution of applications 18 (e.g., applications 18 executed on behalf of the devices 14), and/or may instruct an application server or application store to remove an application 18 identified as malware 20. Thus, the reputation service 70 may facilitate the detection and mitigation of malware 20 based on the resource reputations 72 of the remote resources 62 involved in one or more resource accesses by respective applications 18.

In the context of malware detection and mitigation, the presented techniques may be capable of achieving several advantages, particularly with respect to alternative techniques involving an evaluation of the local resources (e.g., scanning in execution binaries 48 of applications 18 to identify patterns of instructions that are indicative of malware 20) and/or local activities (e.g., local resource utilization and/or locally performed behaviors of respective applications 18). As a first potential advantage, detecting accesses of remote resources 66 may represent a comparatively simple task that may be difficult for malware 20 to obscure, particularly in comparison with detecting other hallmarks of malware 20, such as patterns of instructions (which may be polymorphic, self-altering, and/or hidden in various locations) and detecting behaviors that are frequently performed by malware 20 (which may be performed by the malware 20 in a large variety of platform-dependent ways). Such detection and reporting may therefore be performed at a higher level of detail (e.g., continuously) and/or with significantly lower expenditure of computational resources than some of the other techniques discussed herein.

As a second potential advantage, it may be easier to generalize application reputations 84 and/or resource reputations 72 of remote resources 66 than to generalize other indicators of malware, such as patterns of instructions or behaviors. For example, in addition to assigning a poor application reputation 84 to an application 18 that accesses a remote resource 66 having a poor resource reputation 72 while executing on a device, an embodiment may also assign a poor application reputation 84 to other versions of the application 18 (e.g., older versions, newer versions, or versions for other devices 14); to other or all applications 18 from the same author or source; and to other or all applications 18 that also access the same remote resource 66. Conversely, when an application 18 is identified as malware 20 based on an access of a remote resource 66, an embodiment of these techniques may similarly identify a poor resource reputation 72 for other remote resources 66 from the same author or source (e.g., a file service that is identified as storing a deployable rootkit may also be presumed to store other forms of malware 20) and for other instances of the remote resource 66 provided through other sources. By contrast, it may be difficult to generalize a pattern of instructions in an executable binary 48 is identified as malware 20 to similar sets of instructions, which may only coincidentally resemble the malware 20, or to generalize a behavior that is frequently performed by malware 20 to a class of behaviors, many of which may be legitimate (e.g., it may not be helpful to generalize a exploitation by malware 20 of a vulnerability of an application programming interface to any invocation of the application programming interface).

As a third potential advantage, the presently disclosed techniques may be more amenable to automated application than the other techniques discussed herein. For example, the exemplary scenario presented in FIGS. 3-4 involves the tasks of detecting resource accesses 66 of remote resources 62 and reporting the resource accesses 66 to a reputation service 70; the receipt of the resource accesses 66, evaluation of remote resources 62, identification of resource reputations 72, identification of application reputations 84, and delivery of the application reputation set 82 to devices 14; and the use by the devices 14 of the application reputation set 82 to adjust the execution of applications 18. It may be appreciated that all of these tasks may be automatically performed without the involvement of a malware analyst, and that such automation may enable a rapid but sophisticated and comprehensive response to new malware 20. For example, when a device 14 detects that an application 18 has accessed a remote resource 66 that comprises known malware 20, the reputation service 70 may be promptly notified, may automatically update the application reputation 84 of the application 18, and may notify other devices 14, potentially containing the effects of malware 20 to a small set of devices 14 (perhaps even restricting the malware 20 to a single device 14). By contrast, the other techniques discussed herein involve an extensive study and characterization of malware 20; an identification of patterns of instructions in malware 20; and an identification, characterization, and detection of subtle and often obfuscated behaviors that are indicative of malware 20. Such analyses often involve the expertise (and expense) of human malware analysts, and may result in a considerable delay in deploying a response to the malware 20, during which the malware 20 may execute unchecked on many devices 14. These and other advantages may be achievable through the application of the techniques presented herein.

D. Exemplary Embodiments

Figure 5:
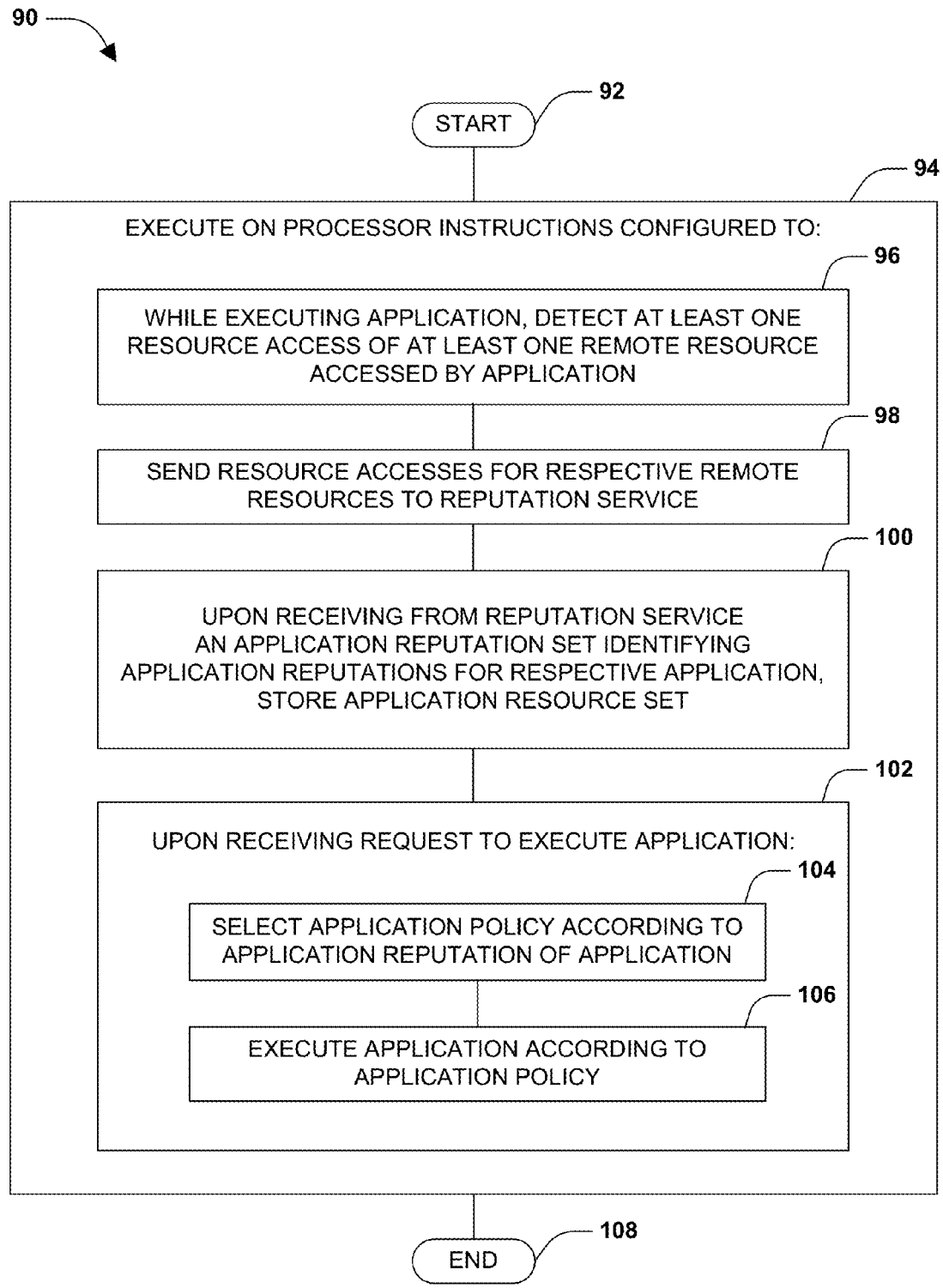
FIG. 5 is a flow chart illustrating an exemplary method of executing applications on a device in accordance with the techniques presented herein.

FIG. 5 presents an illustration of a first exemplary embodiment of these techniques, illustrated as a first exemplary method 90 of executing applications 18 on a device 14 having a processor 42. The first exemplary method 90 may be implemented, e.g., as a set of instructions stored in a memory component of the device 14 (e.g., a memory circuit, a platter of a hard disk drive, a solid-state storage device, or a magnetic or optical disc), where such instructions, when executed on the processor 42, cause the processor 42 to perform the techniques presented herein. The first exemplary 90 begins at 92 and involves executing 94 the instructions on the processor 42 of the device 14. Specifically, the instructions are configured to, while executing an application 18, detect 96 at least one resource access 66 of at least one remote resource 62 accessed by the application 18. The instructions are also configured to send 98 resource accesses 66 for respective remote resources 62 to a reputation service 70. The instructions are also configured to, upon receiving from the reputation service 70 an application reputation set 82 identifying application reputations 84 for respective applications 18, store 100 the application reputation set 82. The instructions are also configured to, upon receiving 102 a request to execute an application 18, select 104 an application policy according to the application reputation 84 of the application 18, and execute 104 the application 18 according to the application policy. In this manner, the first exemplary method 90 achieves the execution of applications 18 according to the application reputations 84, which are, in turn, based on the resource reputations 72 of remote resources 62 accessed by the applications 18, and so the first exemplary method 90 ends at 106.

Figure 6:
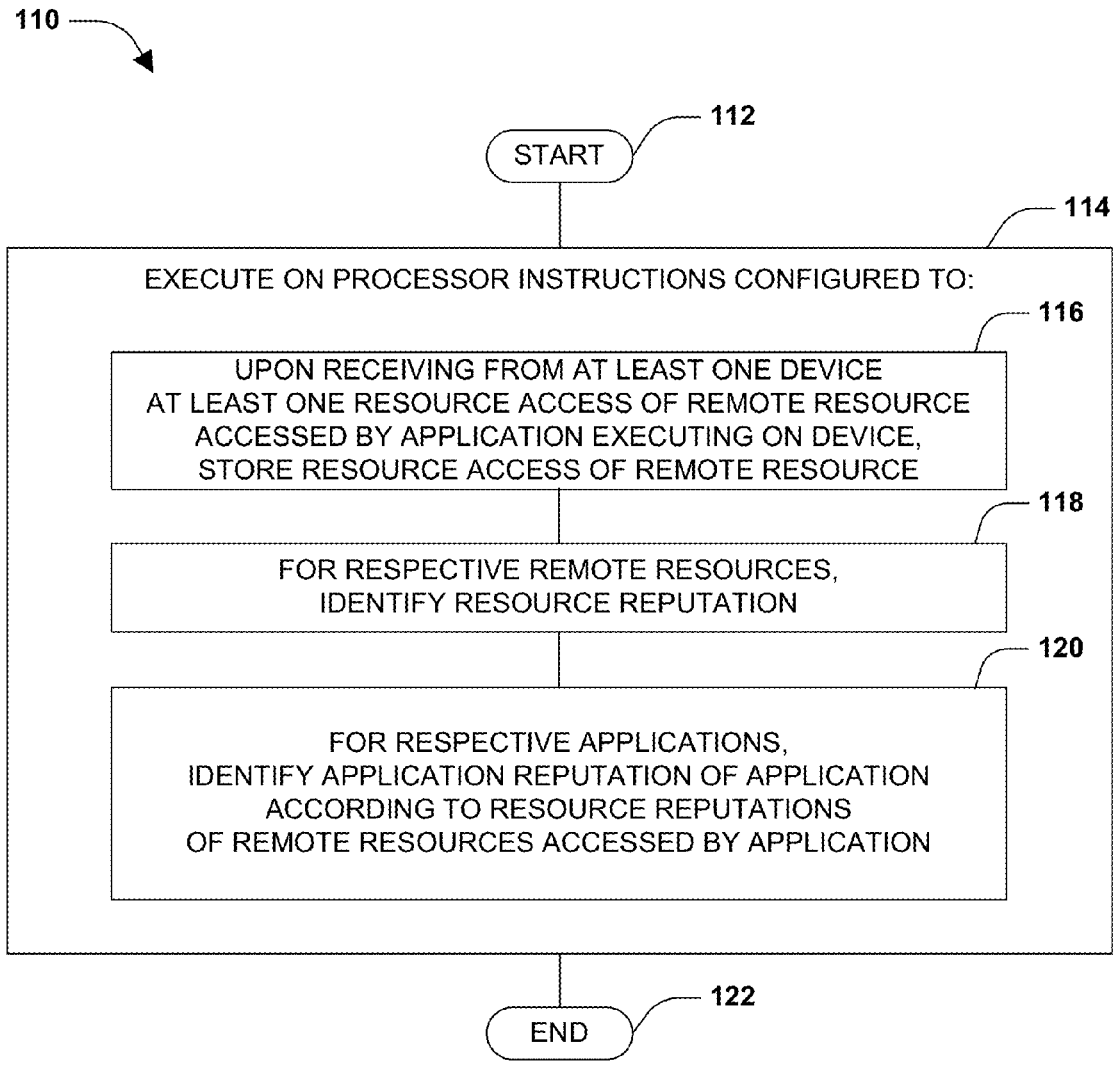
FIG. 6 is a flow chart illustrating an exemplary method of identifying application reputations of applications that may be executed on behalf of a device in accordance with the techniques presented herein.

FIG. 6 presents an illustration of a second exemplary embodiment of these techniques, illustrated as a second exemplary method 110 of identifying, on a computer having a processor 42, application reputations 84 for applications 18 executed on behalf of at least one device 14. The computer may comprise, e.g., an application server that executes applications 18 upon request of a device 14, such as a web application server; a server that provides applications 18 to the devices 14 for execution on the devices 14, such as an application store; or a server of a reputation service 70 that simply advises devices 14 in the execution of applications 18 based on application reputations 84. The second exemplary method 110 may be implemented, e.g., as a set of instructions stored in a memory component of the computer (e.g., a memory circuit, a platter of a hard disk drive, a solid-state storage device, or a magnetic or optical disc), where such instructions, when executed on the processor 42, cause the processor 42 to perform the techniques presented herein. The second exemplary method 110 begins at 112 and involves executing 114 the instructions on the processor 42 of the computer. Specifically, the instructions are configured to, upon receiving from at least one device 14 at least one resource access 66 of a remote resource 62 accessed by an application 18 executing on a device 14, store 116 the resource access 66 of the remote resource 62. The instructions are also configured to, for respective remote resources 66, identify 118 a resource reputation 72. The instructions are also configured to, for respective applications 18, identify 120 an application reputation 84 of the application 18 according to the resource reputations 66 of the remote resources 62 accessed by the application 18. In this manner, the instructions may cause the computer to identify application reputations 84 of respective applications 18 that may be used in a variety of contexts, and the exemplary second method 110 ends at 122.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 7:
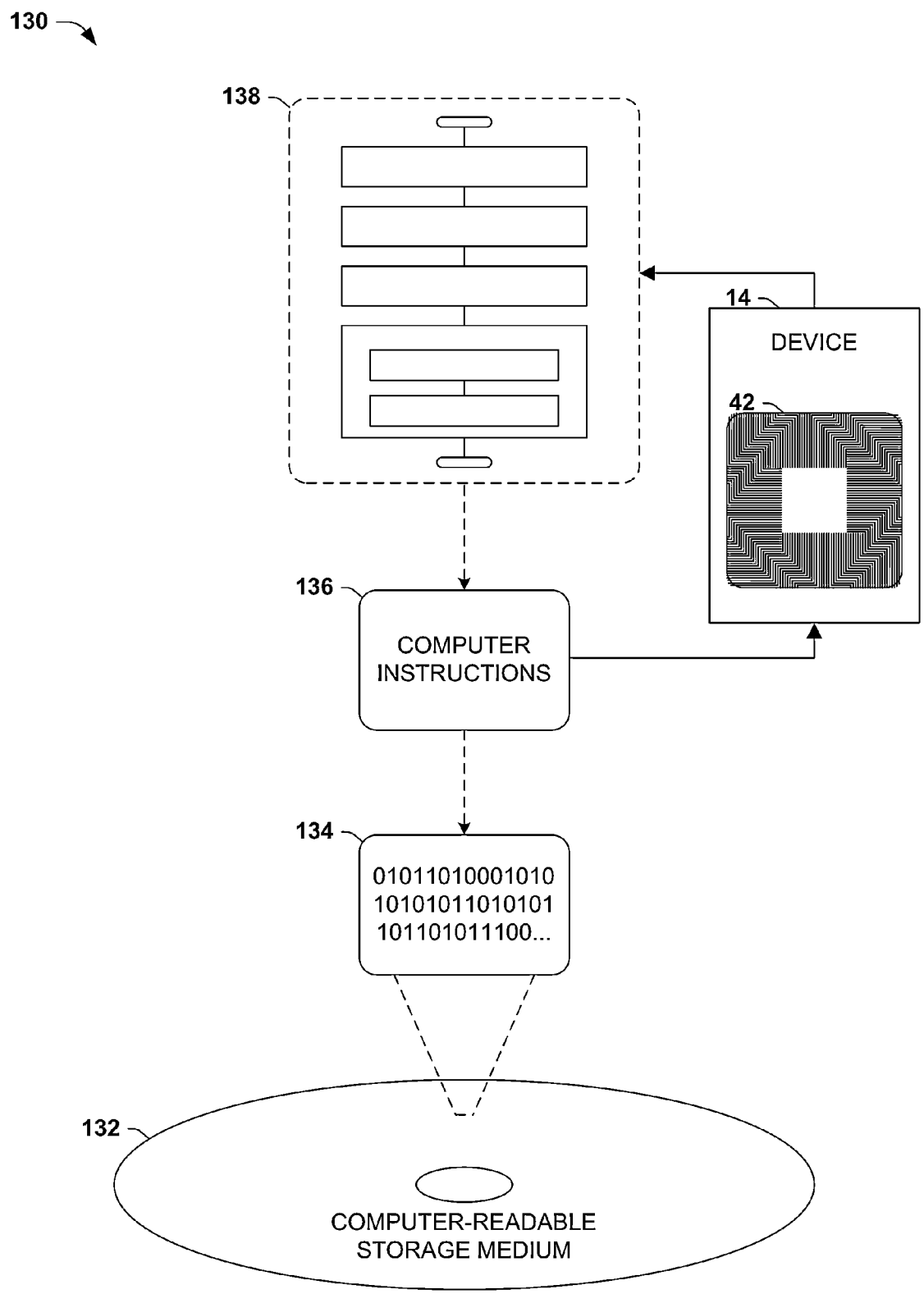
FIG. 7 is an illustration of an exemplary computer-readable medium comprising processor-executable instructions configured to embody one or more of the provisions set forth herein.

An exemplary computer-readable medium that may be devised in these ways is illustrated in FIG. 7, wherein the implementation 130 comprises a computer-readable medium 132 (e.g., a CD-R, DVD-R, or a platter of a hard disk drive), on which is encoded computer-readable data 134. This computer-readable data 134 in turn comprises a set of computer instructions 136 that, when executed on a processor 42 of a device 14, cause the device 14 to perform the techniques presented herein. In one such embodiment, the processor-executable instructions 136 may be configured to perform a method of executing applications on a device, such as the first exemplary method 90 of FIG. 5. In another such embodiment, the processor-executable instructions 136 may be configured to implement a method of identifying application reputations 84 of applications 18 that may be executed on behalf of a device 14, such as the second exemplary method 110 of FIG. 6. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the first exemplary method 90 of FIG. 5 and the second exemplary method 110 of FIG. 6) to confer individual and/or synergistic advantages upon such embodiments.

E1. First Aspect—Scenarios

A first aspect that may vary among embodiments of these techniques involves the scenarios wherein such techniques may be utilized. As a first variation of this first aspect, the techniques may be utilized to identify malware 20 on many types of devices 14, including servers, workstations, media stations, notebook computers, tablet computers, palmtop computers, smartphones, game consoles, networking devices, portable media players, and personal information managers. As a second variation of this first aspect, the techniques may be utilized to monitor malware 20 represented as many types of applications 18 executing in various execution contexts, such as a natively executing application 18 (involving instructions specified in an instruction set that is supported by a processor, and executed directly on the processor); applications 18 managed by one or more runtimes (e.g., a device 14 may comprise a runtime configured to detect the resource accesses 66 of remote resources 62 by the applications 18, and to manage the execution of applications 18 on the processor 42 of the device 14 according to an application policy); applications 18 executing within a virtual environment (e.g., an emulated or virtualized machine, a virtualized application environment, or an isolation construct); applications 18 executing on a platform, such as within a web browser, or as a locally executing web application 18, such as an application designed using web technologies but executing on a device 14 without the encapsulating user interface of a web browser); and cloud applications 18 that are partly or wholly executed on a server on behalf of the device 14 and/or user 12, which may provide a user interface of the application 18 to be rendered on the device 14 for the user 12. Such applications 18 may also be deployed to the device 14 in many ways. For example, an application 18 may be installed on a device 14 by a device vendor; retrieved from an outside source and deployed at the request of a user 12; covertly installed on a device 14 by an outside party 24; retrieved from a server operating as an application store, a mesh server, or a web application server.

As a third variation of this first aspect, these techniques may be utilized to detect, identify, and mitigate many types of malware 20, including viruses, worms, trojans, rootkits, phishing tools, and adware, and to mitigate many effects of such malware 20, including proliferation, device commandeering, enrollment of a device 14 in a botnet, the distribution of spam, phishing, device damage or destruction, and the displaying of advertisements to the user 12. As a fourth example of this first aspect, these techniques may be utilized by detecting resource accesses 66 of many types of resources 62, such as many types of files, databases, sets of web content, servers, services, remote devices, network addresses, users, organizations, and geographic areas. As a fifth variation of this first aspect, the reputation service 70 may have many types of relationships with the devices 14 and/or users 12 thereof; e.g. the reputation service 70 may be provided on a device operated by a user 12 of the device(s); by a security vendor; by an enterprise (e.g., a corporation, nonprofit organization, university, or government) to reduce the impact of malware 20 on the devices 14 managed by the enterprise; or by a centralized agency. Those of ordinary skill in the art may devise many such scenarios wherein the techniques presented herein may be utilized.

E2. Second Aspect—Variations of Exemplary Embodiments

A second aspect that may vary among embodiments relates to variations in the elements of these techniques, such as the elements of the exemplary embodiments illustrated in FIGS. 5, 6, and 7. As a first variation of this second aspect, the detection of resource accesses 66 of respective remote resources 62 may be achieved in many ways. For example, an embodiment of these techniques may monitor requests to access a network adapter 44 of the device 14 (e.g., as part of a device driver of the network adapter 44), and trace such requests to respective applications 18; may monitor a network protocol or network application programming interface (API) through which the requests for resource accesses 66 of remote resources 62 may be initiated; or may directly monitor applications 18 and requests issued thereby, e.g., through a runtime configured the service the applications 18 and broker requests for resource accesses 66 of remote resources 62. Alternatively or additionally, this detection may be performed beyond the device 14, e.g., by network devices such as routers, domain administrating hardware, or an internet service provider (ISP) through which resource accesses 66 for remote resources 62 may flow.

As a second variation of this second aspect, the reporting of resource accesses 66 to the reputation service 70 may be performed in many ways. As a first such variation, a resource access report 68 sent by a device 14 to the reputation service 70 may include information about the device 14 (e.g., the identity, type, configuration, and state of the device 14); information about one or more applications 18 and/or processes 50 involved in a resource access 66 (e.g., the identity, type, configuration, state, resource utilization, and behavior of the application 18 and/or process 50, before and/or after the resource access 66); information about the remote resources 62 involved in the resource access 66 (e.g., the identity, type, and network address of the remote resource 62, as well as any history of prior interaction between the application 18 or device 14 and the remote resource 62); and the resource access 66 (e.g., whether the resource access 66 was initiated by the application 18 or the remote resource 66; the data sent from the application 18 to the remote resource 66, and from the remote resource 66 to the application 18; and whether or not the resource access 66 was permitted or blocked). Alternatively or additionally, the resource access report 68 may include all information about all resource accesses 66, and/or may be filtered to include only information of interest, only information about applications 18, resource accesses 66, and/or remote resources 62 of interest. For example, a user 12 may (intentionally or inadvertently) direct an application 18 to access a remote resource 62 having a poor resource reputation 72, but this resource access 66 is not diagnostic of a malicious behavior of the application 18. Rather, it may be desirable to filter the resource access report 68 to resource accesses 66 initiated by the applications 18 in the absence of a request from a user 12.

As a third variation of this second aspect, a device 14 may send a resource access report 68 at various time and/or in response to various events (e.g., upon detecting an event selected from an event set, including a periodic event, such as an elapsed period; an application status change event, such as a transition of an application 18 from an idle state to an active state 18, or an application behavior change event, such as the detection of a new behavior of an application 18; a system event, such as a reboot of the device 14; or a resource access event (e.g., promptly after receiving a request to perform a resource access 66 and/or detecting a resource access 66). In the latter scenario, the device 14 may perform the resource access 66 on behalf of the application 18 while sending the resource access report 68 to the reputation service 70, and/or may block the resource access 66 until the reputation service 70 has evaluated the resource access 66 and identified a resource reputation 72 of the remote resource 62 and/or an application reputation 84 of the application 18.

As a fourth variation of this second aspect, the reputation service 72 may utilize a wide variety of techniques to evaluate a remote resource 62 in order to identify a resource reputation 72, such as whitelists and/or blacklists generated by and/or shared with other organizations, various evaluation techniques for files or web content, trust certificates that may be provided by the remote resources 62, and/or behavioral profiling of the remote resource 62. In particular, it may be desirable to detect resource accesses 66 of remote resources 62 while the application 14 is executing in a controlled environment, and to perform a comparison of such resource accesses 66 with the resource accesses 66 reported by the devices 14 while the application 18 is executing thereupon. As a second such variation, the evaluation may be wholly or partially automated using various heuristics and machine learning algorithms, and/or may be wholly or partially performed by human malware analysts. Various forms of collaboration among organizations may also be utilized in evaluating the nature of a remote resource 62 in order to identify the resource reputation 72. Those of ordinary skill in the art may devise many techniques for evaluating remote resources 62 to identify a resource reputation 72 therefor.

As a fifth variation of this second aspect, a reputation service 70 may utilize an application reputation set 82 identifying application reputations 84 for respective applications 18 in many ways. As a first example of this fifth variation, the reputation service 70 may enable a device 14 to choose a suitable application policy for executing an application 18 according to the application reputation 84 of the application 14. Such application policies may include, e.g., an unrestricted application policy specifying no restrictions of the application 18; a warning application policy, specifying a warning to be presented to a user 14 about the application reputation 84 of the application 18; a consent application policy specifying that a notification is to be presented to the user 14 regarding resource accesses 66 of the application 18 and including a consent option selectable by the user 14 (e.g., "This application is attempting to access a remote resource 62 with a poor resource reputation 66; do you wish to allow this resource access 66?"), and a restriction against performing the resource access 66 unless the consent option is selected by the user 14; a restricted application policy, specifying at least one restriction of at least one capability of the application 18 (e.g., a network bandwidth cap, or a restriction against accessing a network 64, or a restriction against interacting with any other application 18); an isolation application policy specifying an isolated execution of the application 18 (e.g., an execution of the application 18 within a sandbox that completely isolates the application 18 within the computing environment of the device 14); and a prohibited application policy specifying a prohibition of executing the application 18 (e.g., a refusal to execute an application 18 known to comprise malware 20). Such application policies may be selected and utilized, e.g., by a server executing the application 18 on behalf of one or more devices 14, and/or by a device 14 receiving the application reputations 84 from the reputation service 70 and upon which a request to execute an application 18 has been received. Moreover, it may be possible for such devices 14 to adjust the application policy of an application 18 based on an application reputation 84 received from the reputation service 70 while the application 18 is executing (e.g., warning a user 12 about an executing application 18, imposing access restrictions on an executing application 18, or entirely shutting down a process 50 of an application 18 upon receiving a poor application reputation 84 for the application 18).

As a second example of this fifth variation, the reputation service 70 may utilize the application reputations 84 of respective applications 18 in other ways, e.g., to adjust the availability and delivery to devices 14 of applications 18 through an application store or application source (e.g., removing applications 18 from an application store for which a poor application reputation 84 is identified, or, upon receiving a request to deliver an application 18 to a device 14, selecting and delivering with an application 18 an application policy according to the application reputation 84 of the application 18); to trace malware 20 back to malware designers and/or malware sources; and to train automated machine learning algorithms for evaluating remote resources 62 to detect malware 20 with improved accuracy and sophistication. The reputation service 70 may also specify the application reputations 84 in various ways, e.g., identifying application reputations 84 for entire applications 18 and/or for particular application components of an application 18 (e.g., identifying different application reputations 84 for different libraries or web content comprising the application 18, such that different application policies may be applied to different application components based on the application reputations 84 thereof). Those of ordinary skill in the art may devise many variations in the elements of the embodiments of the techniques presented herein.

E3. Third Aspect—Additional Features

A third aspect that may vary among embodiments of these techniques relates to additional features that may be included in respective embodiments of these techniques. As a first variation of this third aspect, the techniques presented herein, involving the detection of malware 20 based on resource accesses 66 by respective applications 18 of remote resources 62 having identified resource reputations 72, may be may be used exclusively, or may be combined with one or more other types of techniques for detecting malware 20, such as the evaluation of code for patterns of instructions that resemble malware 20, the evaluation of local resource utilization, and the detection of local behaviors that may be characteristic of malware. Moreover, such analyses may be performed independently, or may be used in synergy to generate more sophisticated detection of malware 20. For example, in addition to detecting resource accesses 66 of remote resources 62 by an application, a device 14 may be configured to detect application behaviors of the application 18, and to report application behavior indicators of such application behaviors to the reputation service 70. Accordingly, the reputation service 70 may, while identifying an application reputation 84 of an application 18, utilize both the resource reputations 72 of resources 62 accessed by the application 18, and also application behavior indicators detected and reported by one or more devices 14 that indicate the application behaviors of the application 18. As one such example, an application 18 may be detected to both a spontaneous and covert resource access 66 of a remote resource 62 having a questionable resource reputation 72, and also a covert attempt to intercept user input provided by a user 12 to another application 18; while each detection may alone indicate some questionable activity of the application 18, the combination of the resource access 66 and the application behavior together strongly suggest a phishing type of malware 20.

As a second variation of this third aspect, in addition to utilizing and/or sending to devices 14 an application reputation set 82 comprising the application reputations 84 identified for respective applications 18, it may be also advantageous to utilize and/or send to devices 14 the resource reputations 72 of the resources 62 accessed by the applications 18. As a second example, and as the converse of identifying application reputations 84 based on the resource reputations 72 of remote resources 62 accessed by an application 18, the reputation service 70 may identify resource reputations 72 of respective remote resources 62 based on the application reputations 84 of applications 18 accessing the remote resources 62. In one such embodiment, the establishment of resource reputations 72 and application reputations 82 may be achieved in an iterative and incremental manner (e.g., performing a small adjustment of the resource reputations 72 of remote resources 62 based on the application reputations 82 of applications 18 accessing the remote resources 62, and performing a small adjustment of the application reputations 84 of applications 18 based on the resource reputations 72 of resources 62 accessed by the applications 18), thereby achieving a consensus-building of the respective reputations through gradual convergence. As a second example, in addition to identifying a particular application 18 as having a poor application reputation 84 indicating a strong probability that the application 18 includes malware 20, the reputation service 70 may report to the devices 14 and/or or utilize a poor resource reputation 72 of the resources 62 utilized by the malware 20; e.g., by blocking access by any application 18 to such resources 62. Those of ordinary skill in the art may devise many such additional features that may be included in embodiments of the techniques presented herein.

F. Computing Environment

Figure 8:
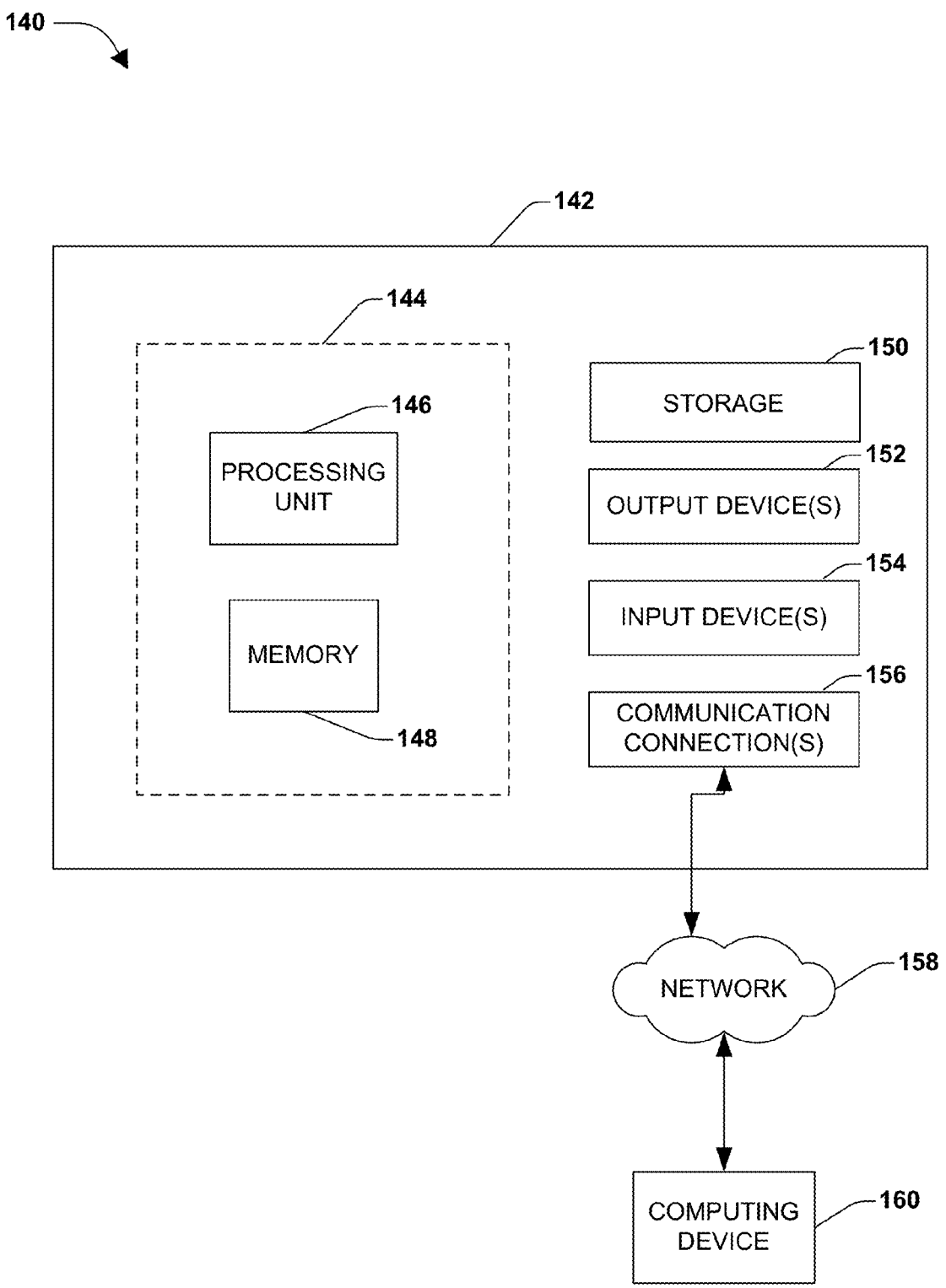
FIG. 8 illustrates an exemplary computing environment wherein one or more of the provisions set forth herein may be implemented.

FIG. 8 presents an illustration of an exemplary computing environment within a computing device 142 wherein the techniques presented herein may be implemented. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, and distributed computing environments that include any of the above systems or devices.

FIG. 8 illustrates an example of a system 140 comprising a computing device 142 configured to implement one or more embodiments provided herein. In one configuration, the computing device 142 includes at least one processor 146 and at least one memory component 148. Depending on the exact configuration and type of computing device, the memory component 148 may be volatile (such as RAM, for example), non-volatile (such as ROM, flash memory, etc., for example) or an intermediate or hybrid type of memory component. This configuration is illustrated in FIG. 8 by dashed line 144.

In some embodiments, device 142 may include additional features and/or functionality. For example, device 142 may include one or more additional storage components 150, including, but not limited to, a hard disk drive, a solid-state storage device, and/or other removable or non-removable magnetic or optical media. In one embodiment, computer-readable and processor-executable instructions implementing one or more embodiments provided herein are stored in the storage component 150. The storage component 150 may also store other data objects, such as components of an operating system, executable binaries comprising one or more applications, programming libraries (e.g., application programming interfaces (APIs), media objects, and documentation. The computer-readable instructions may be loaded in the memory component 148 for execution by the processor 146.

The computing device 142 may also include one or more communication components 156 that allow the computing device 142 to communicate with other devices. The one or more communication components 156 may comprise (e.g.) a modem, a Network Interface Card (NIC), a radiofrequency transmitter/receiver, an infrared port, and a universal serial bus (USB) USB connection. Such communication components 156 may comprise a wired connection (connecting to a network through a physical cord, cable, or wire) or a wireless connection (communicating wirelessly with a networking device, such as through visible light, infrared, or one or more radiofrequencies.

The computing device 142 may include one or more input components 154, such as keyboard, mouse, pen, voice input device, touch input device, infrared cameras, or video input devices, and/or one or more output components 152, such as one or more displays, speakers, and printers. The input components 154 and/or output components 152 may be connected to the computing device 142 via a wired connection, a wireless connection, or any combination thereof. In one embodiment, an input component 154 or an output component 152 from another computing device may be used as input components 154 and/or output components 152 for the computing device 142.

The components of the computing device 142 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of the computing device 142 may be interconnected by a network. For example, the memory component 148 may be comprised of multiple physical memory units located in different physical locations interconnected by a network.

Those skilled in the art will realize that storage devices utilized to store computer readable instructions may be distributed across a network. For example, a computing device 160 accessible via a network 158 may store computer readable instructions to implement one or more embodiments provided herein. The computing device 142 may access the computing device 160 and download a part or all of the computer readable instructions for execution. Alternatively, the computing device 142 may download pieces of the computer readable instructions, as needed, or some instructions may be executed at the computing device 142 and some at computing device 160.

G. Usage of Terms

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of executing applications on a device having a processor, the method comprising:
   executing on the processor instructions that cause the device to:
      while executing an application, detect at least one resource access of at least one remote resource accessed by the application;
      send resource accesses for respective remote resources to a reputation service;
      upon receiving from the reputation service an application reputation set identifying application reputations for respective applications:
         store the application reputation set;
         identify at least one application on the device that is executing according to an application policy; and
         adjust the application policy of the application according to the application reputation of the application in the application reputation set.

2. The method of claim 1, respective resource accesses of remote resources requested automatically by the application without specification by a user of the application.

3. The method of claim 1:
   the device comprising a runtime configured to manage execution of applications on the processor of the device;
   detecting the at least one resource access comprising: configuring the runtime to detect at least one resource access of at least one remote resource accessed by the application; and
   adjusting the execution policy of the application further comprising:
      instructing the runtime to adjust the application policy of the application according to the application reputation of the application in the application reputation set.

4. The method of claim 1:
   the application comprising a web application; and
   at least one resource access comprising: an access of web content accessed by the application.

5. The method of claim 1, at least one remote resource comprising: at least one remote device that is contacted by the application.

6. The method of claim 1, sending the resource accesses to the reputation service comprising: sending the resource accesses upon detecting an event selected from an event set comprising:
   a periodic event;
   an application status change event;
   an application behavior change event;
   a system event; and
   a resource access event comprising a resource access of the remote resource by the application.

7. The method of claim 1, the application policy selected from an application policy set comprising:
   an unrestricted application policy specifying no restrictions of the application;
   a warning application policy specifying a warning to be presented to a user of the application;
   a consent application policy specifying:
      a notification to be presented to the user regarding resource accesses of the application with a consent option selectable by the user, and
      a prohibition of executing the application until the consent option is selected by the user;
   a restricted application policy specifying at least one restriction of at least one capability of the application;
   an isolation application policy specifying an isolated execution of the application; and
   a prohibited application policy specifying a prohibition of executing the application.

8. The method of claim 1:
   at least one application comprising at least one application component; and
   the instructions configured to apply the application policy to at least one application component of the application.

9. The method of claim 1, the instructions configured to:
   upon receiving from the reputation service a resource reputation set comprising at least one resource reputation of at least one remote resource, store the resource reputation set; and
   upon receiving a request to execute an application:
      select an application policy according to the resource reputations of the remote resources accessed by the application; and
      execute the application according to the application policy.

10. The method of claim 1, the instructions configured to:
    while executing an application, detect at least one application behavior indicator of at least one application behavior of the application; and
    send the at least one application behavior indicator to the reputation service.

11. A method of identifying, on a computer having a processor, application reputations for applications executed on behalf of at least one device, the method comprising:
    executing on the processor instructions that cause the computer to:
       upon receiving from at least one device at least one resource access of a remote resource and an application identifier of an application executing on the device and requesting the resource access of the remote resource, store the resource access of the remote resource;

for respective remote resources, identify a resource reputation;

for respective applications, identify an application reputation of the application according to the resource reputations of the remote resources accessed by the application;

generate an application reputation set specifying, for respective applications, the application identifier of the application and an application reputation of the application according to the resource accesses of remote resources accessed by the application; and send the application reputation set to at least one device.

12. The method of claim 11:
the computer configured to execute applications on behalf of at least one device; and
the instructions configured to, upon receiving a request from a device to execute an application:
 select an application policy according to the application reputation of the application; and
 execute the application according to the application policy.

13. The method of claim 11:
at least one application stored on the computer for delivery to devices; and
the instructions configured to, upon receiving a request to deliver an application to a device:
 select an application policy according to the application reputation of the application; and
 deliver the application policy with the application to the device.

14. The method of claim 11, the instructions configured to:
generate a resource reputation set comprising resource reputations of remote resources that may be accessed by applications executing on a device; and
send the resource reputation set to at least one device.

15. The method of claim 11:
the application comprising a web application; and
at least one resource access comprising: an access of web content accessed by the application.

16. The method of claim 11, at least one remote resource comprising: at least one remote device that is contacted by the application.

17. The method of claim 11:
the instructions configured to:
 detect at least one resource access of at least one remote resource accessed by the application executing in a controlled environment, and
 generating a comparison of the resource accesses of the application executing in the controlled environment and the resource accesses of the application executing on at least one device; and
identifying the application reputation comprising: identifying the application reputation based on the comparison.

18. The method of claim 11:
the instructions configured to, upon receiving from at least one device at least one application behavior indicator of at least one application behavior of an application detected by the device while executing the application, store the at least one application behavior indicator; and
identifying application reputations comprising: for respective applications, identify an application reputation of the application according to the resource reputations of the remote resources accessed by the application and the at least one application behavior indicated by the application behavior indicators of the application.

19. A memory device comprising instructions that, when executed on a processor of a computing device, cause the computing device to execute applications by:
while executing an application, detecting at least one resource access of at least one remote resource accessed by the application;
sending resource accesses for respective remote resources to a reputation service;
upon receiving from the reputation service an application reputation set identifying application reputations for respective applications:
 storing the application reputation set;
 identifying at least one application on the device that is executing according to an application policy; and
 adjusting the application policy of the application according to the application reputation of the application in the application reputation set.

20. The method of claim 1, wherein executing the instructions further causes the device to, upon receiving a request to execute an application and before executing the application:
select an application policy for the application according to the application reputation of the application; and
initiate execution of the application according to the application policy.

* * * * *